Sept. 2, 1941.  E. O. HAMREN  2,254,219
ABRADING APPARATUS
Filed July 16, 1937  11 Sheets-Sheet 1
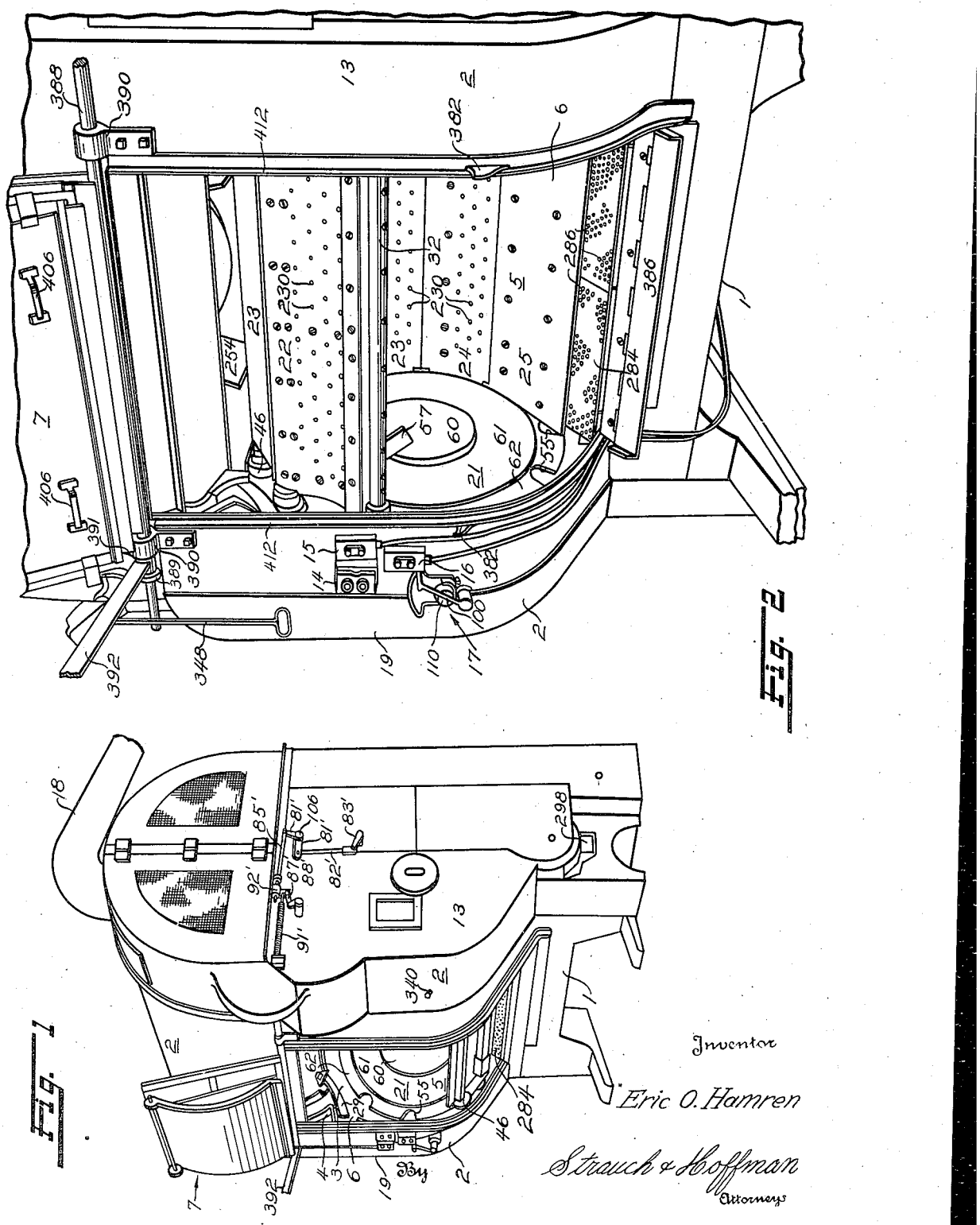
Inventor
Eric O. Hamren
Strauch & Hoffman
Attorneys

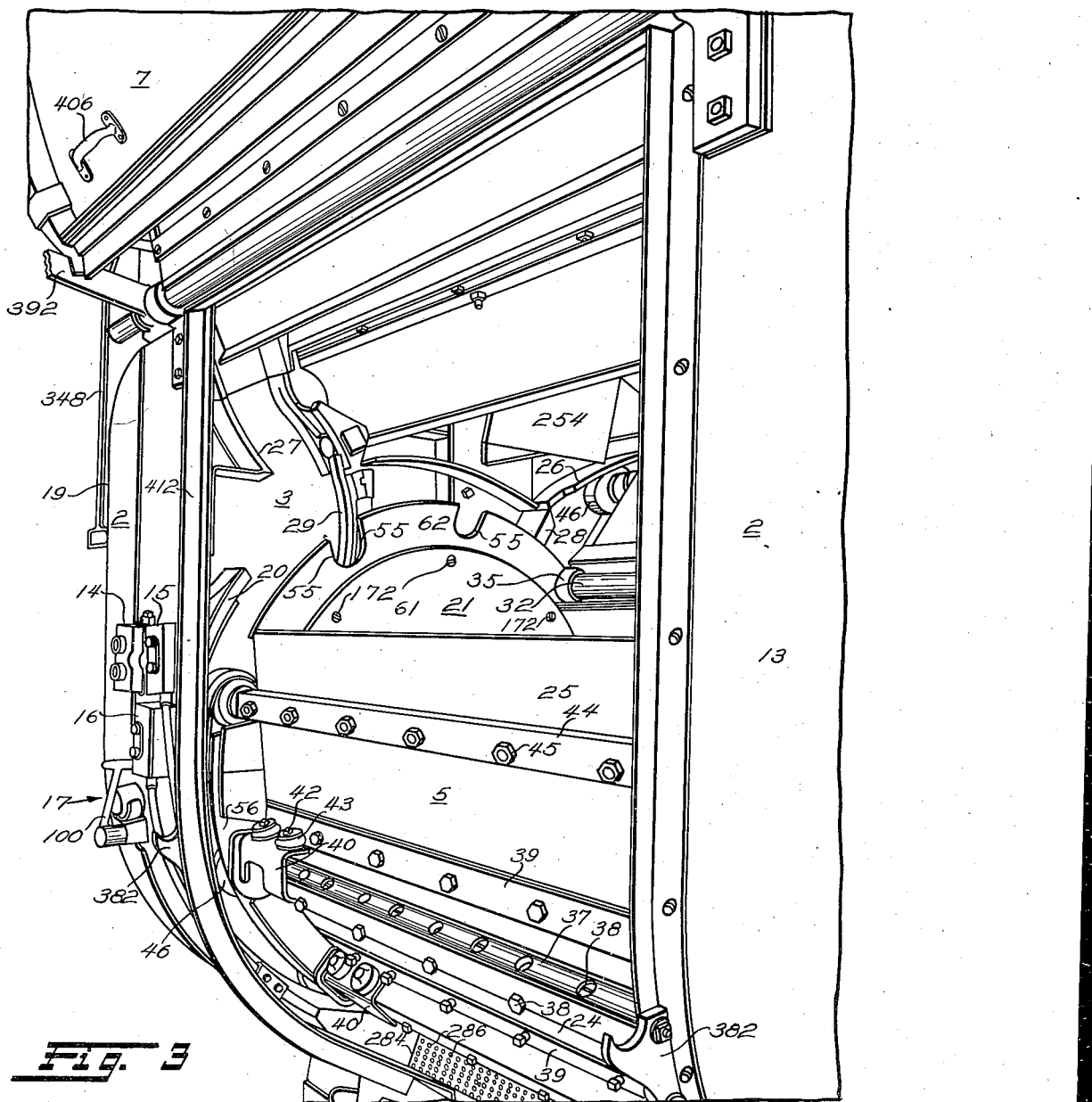

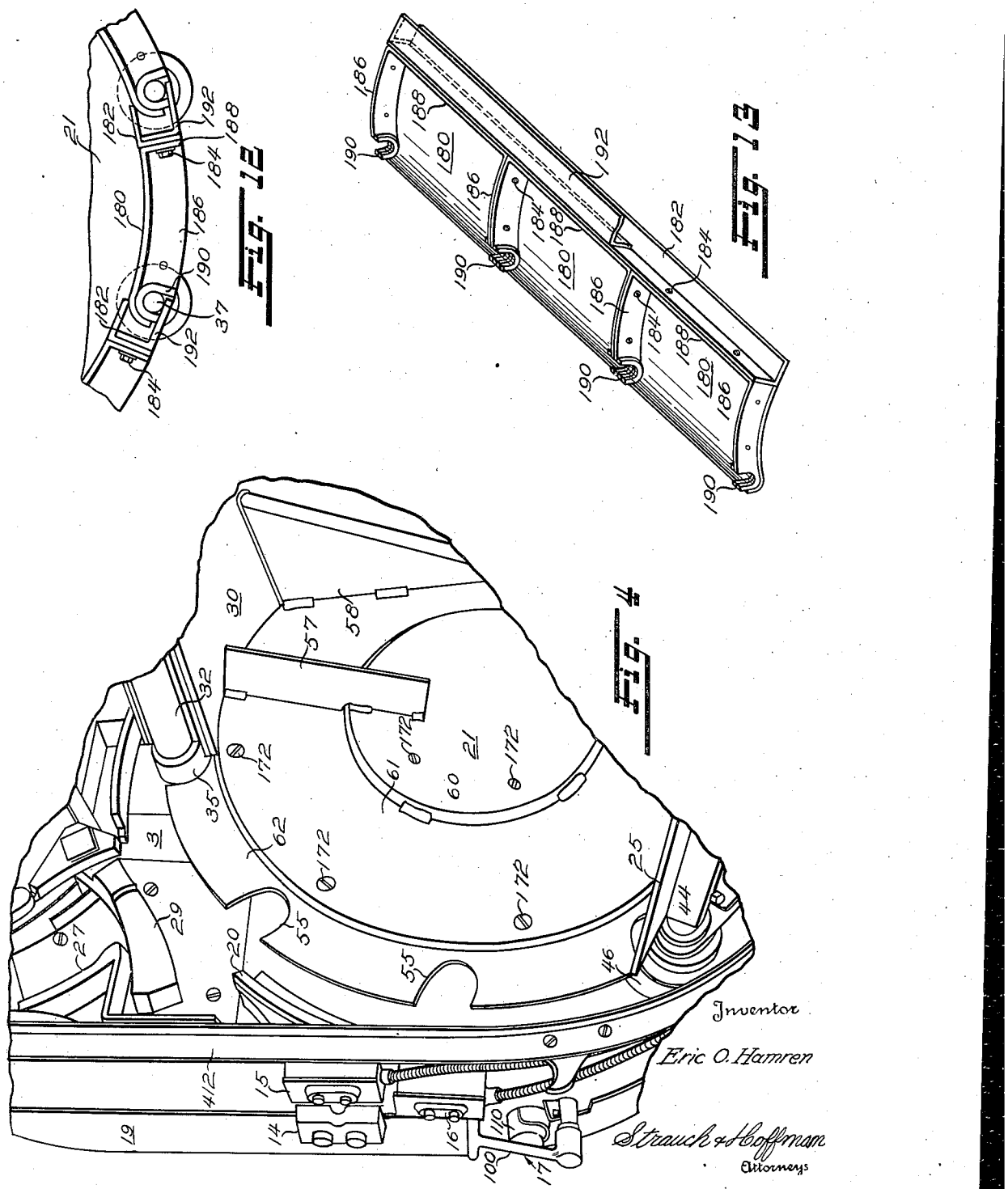

Sept. 2, 1941. E. O. HAMREN 2,254,219
ABRADING APPARATUS
Filed July 16, 1937 11 Sheets-Sheet 4
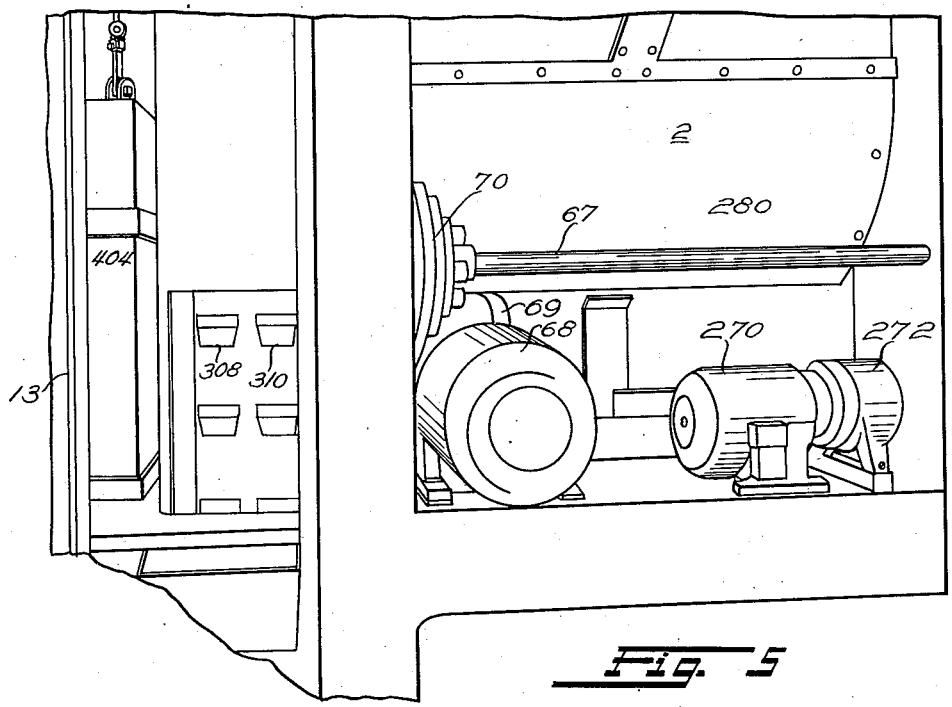
Fig. 5
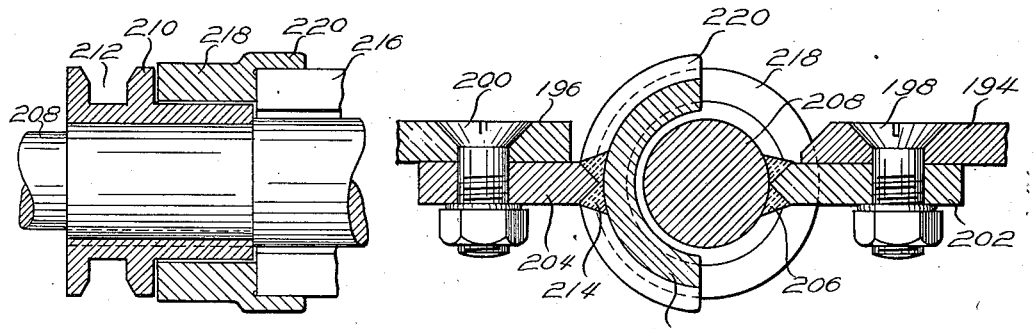
Fig. 16
Fig. 14
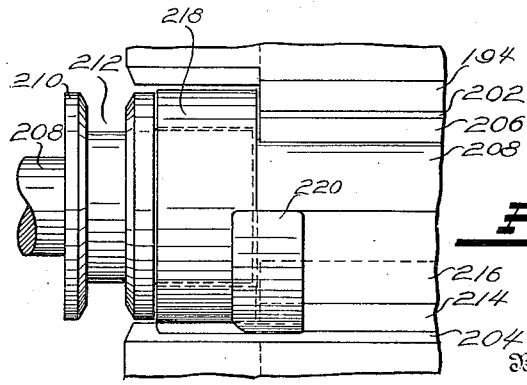
Fig. 15
Inventor
Eric O. Hamren
By Strauch & Hoffman
Attorneys Sept. 2, 1941.  E. O. HAMREN  2,254,219
ABRADING APPARATUS
Filed July 16, 1937  11 Sheets-Sheet 6
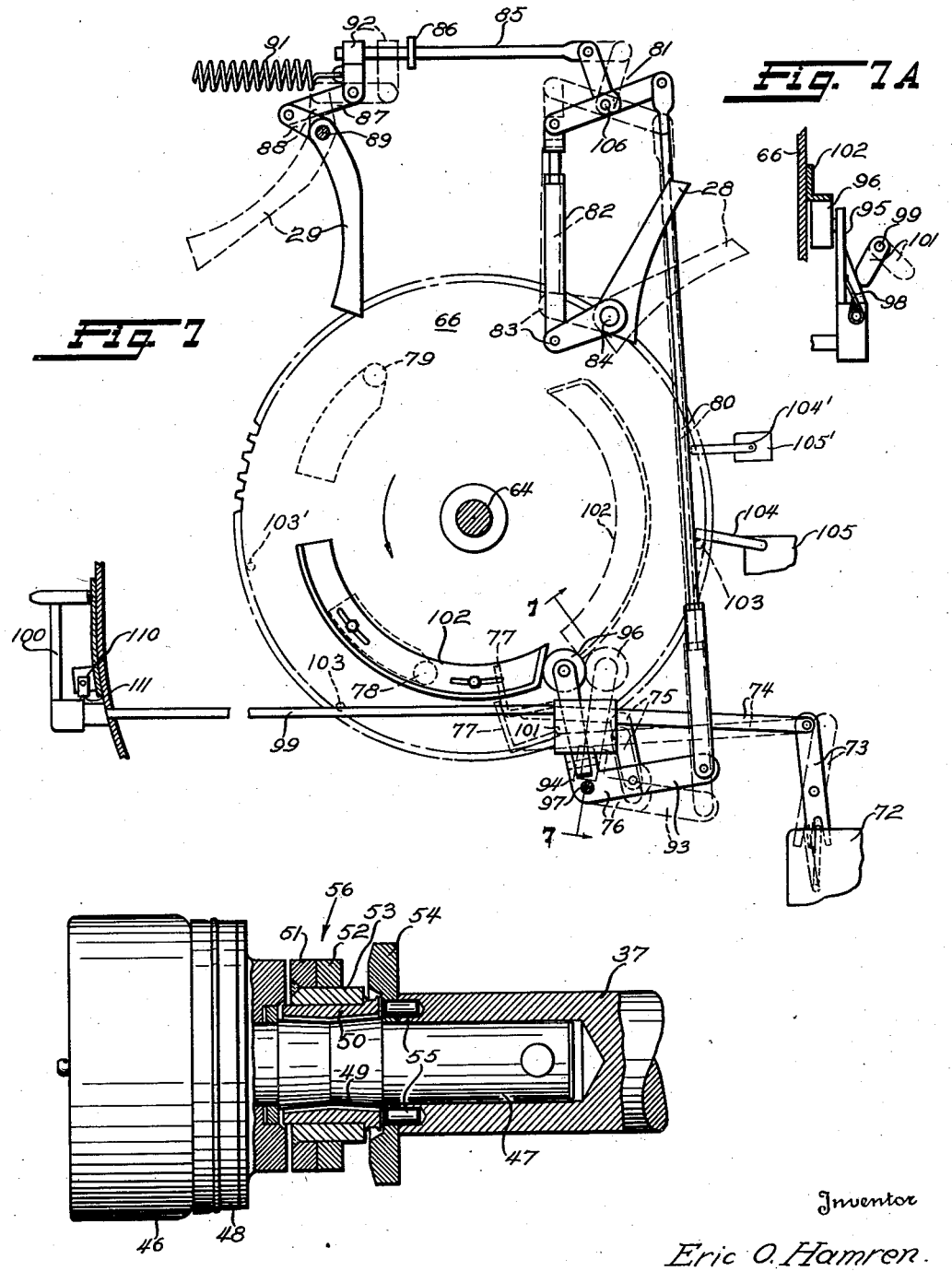
Inventor
Eric O. Hamren.
By Strauch & Hoffman
Attorneys

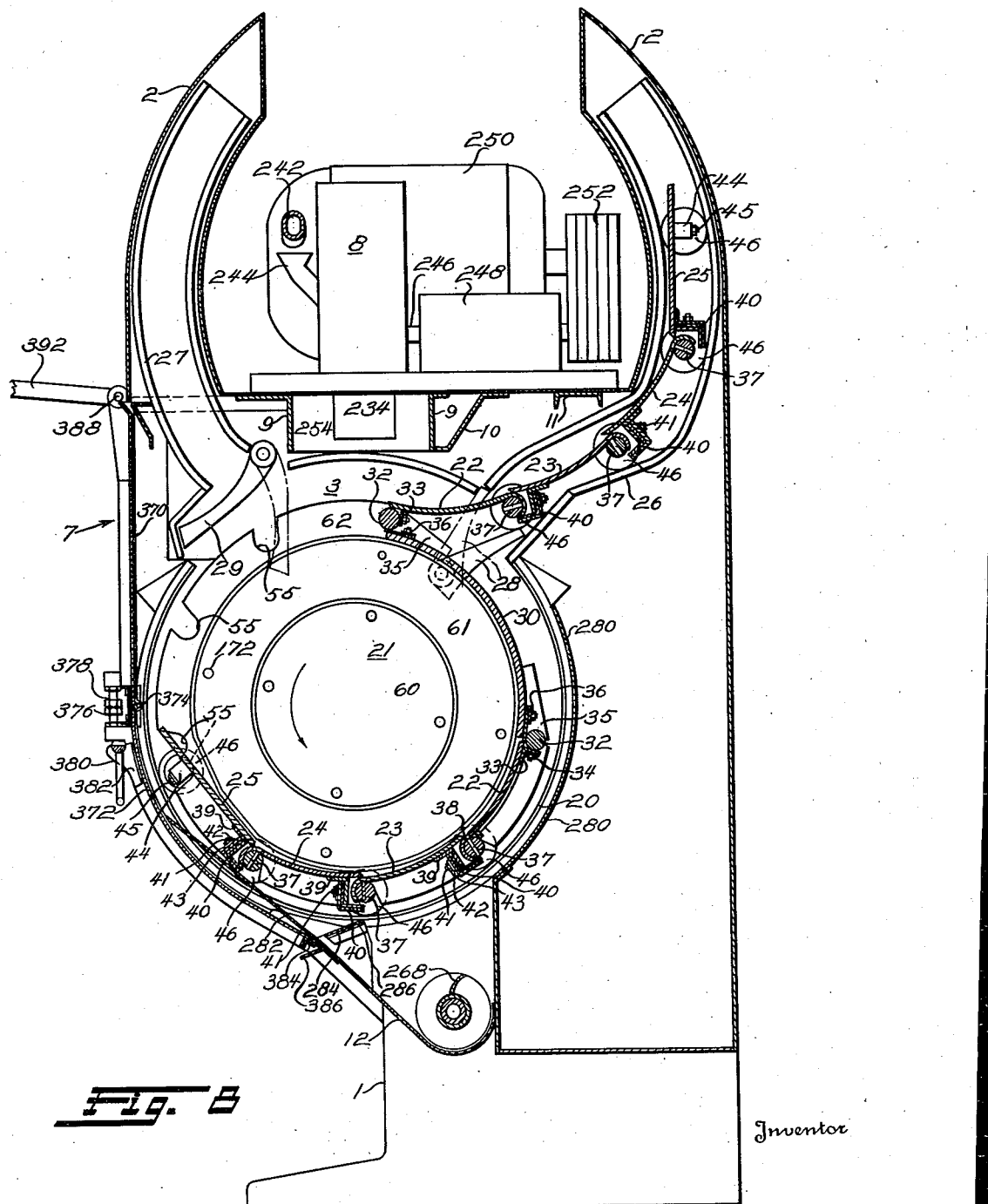

Sept. 2, 1941.  E. O. HAMREN  2,254,219
ABRADING APPARATUS
Filed July 16, 1937  11 Sheets-Sheet 8

Inventor
Eric O. Hamren
By Strauch & Hoffman
Attorneys

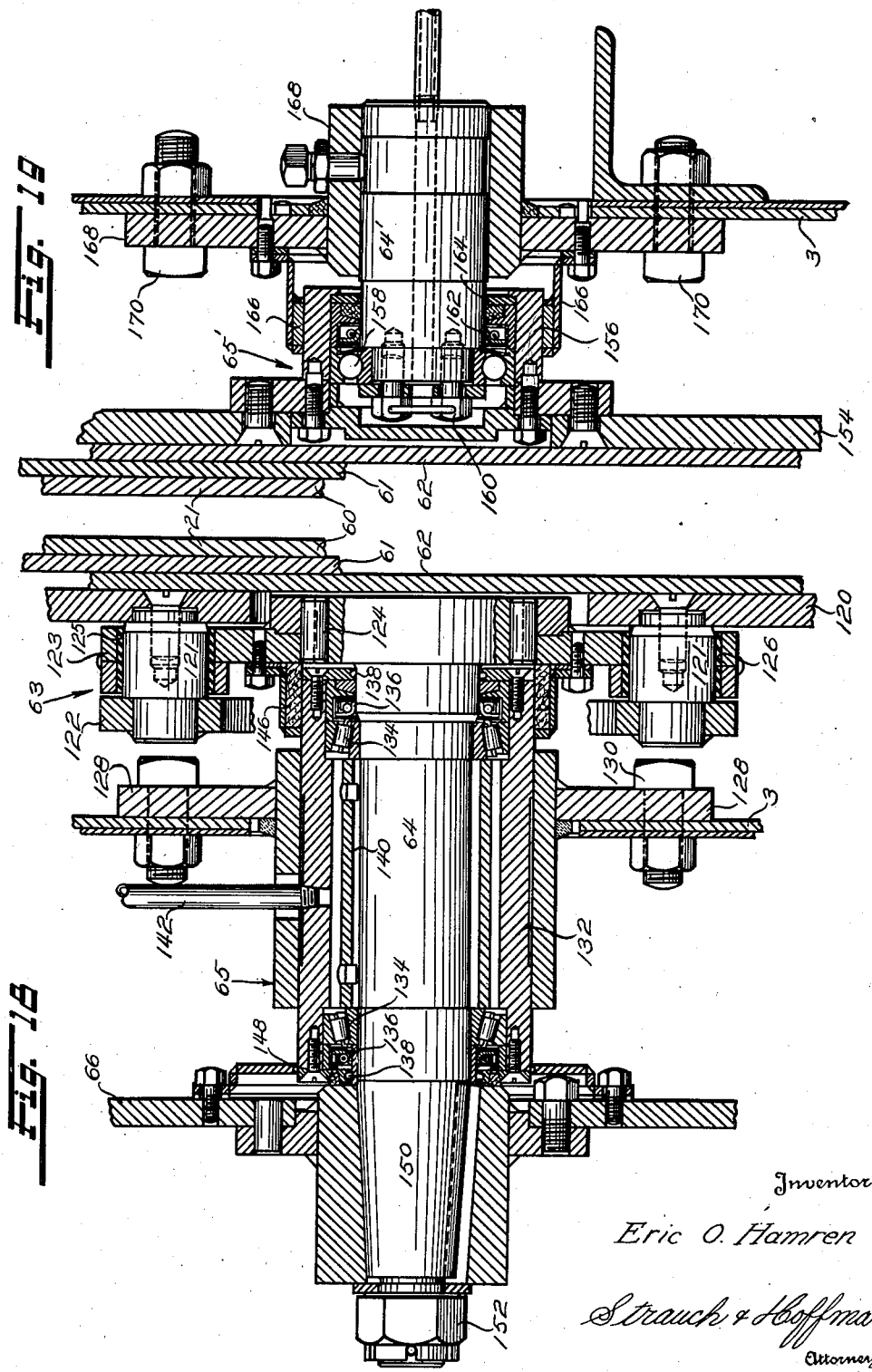

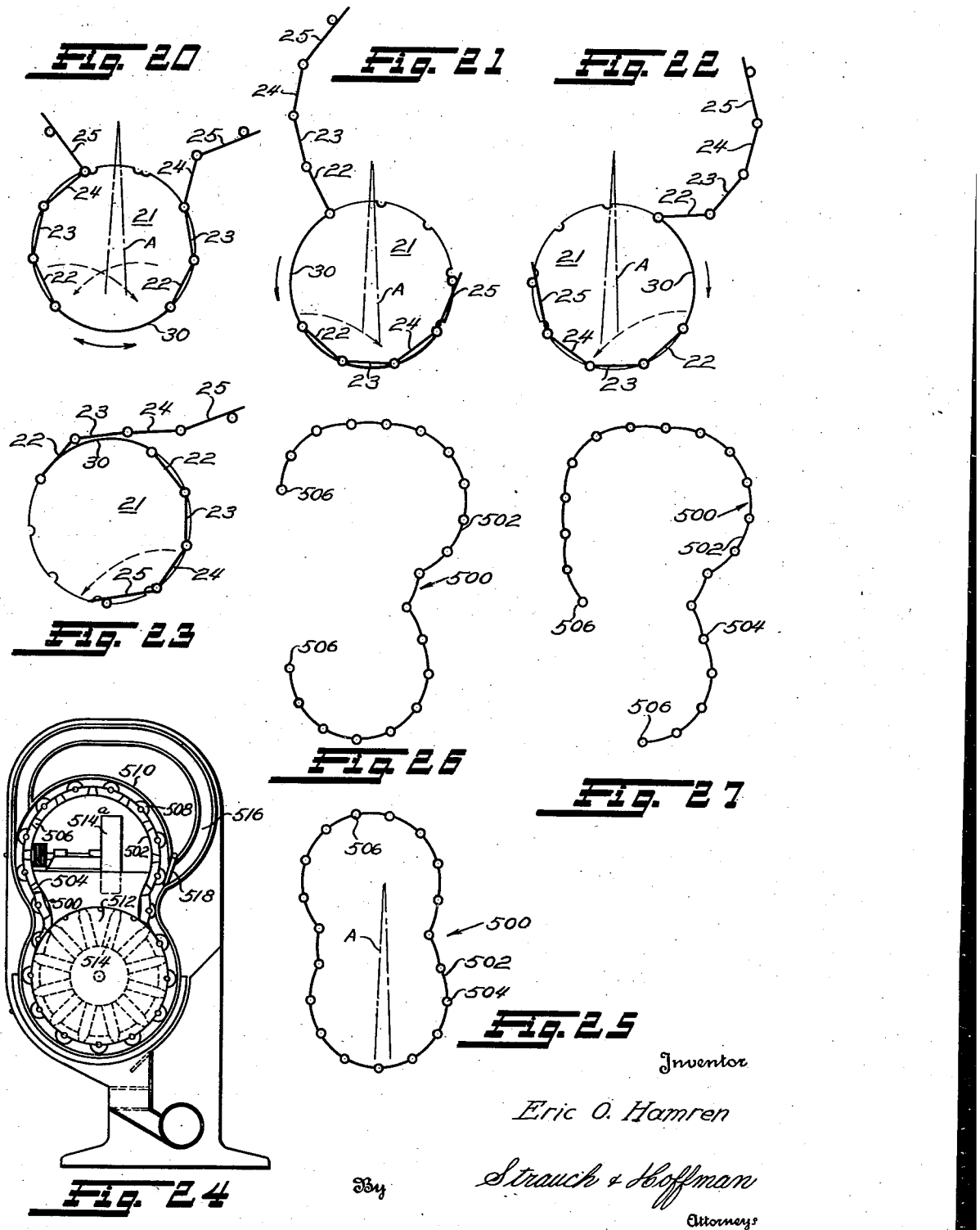

Sept. 2, 1941.  E. O. HAMREN  2,254,219
ABRADING APPARATUS
Filed July 16, 1937    11 Sheets-Sheet 11

Inventor
Eric O. Hamren
By Strauch & Hoffman
Attorneys

Patented Sept. 2, 1941

2,254,219

UNITED STATES PATENT OFFICE 2,254,219

ABRADING APPARATUS

Eric O. Hamren, Hagerstown, Md., assignor to Pangborn Corporation, Hagerstown, Md., a corporation of Maryland Application July 16, 1937, Serial No. 154,105

22 Claims. (Cl. 51—9)

This invention relates to abrading mechanism and is particularly concerned with improvements in that type of abrading machine wherein objects are subjected to the action of a stream of abrasive while being tumbled about within a work chamber so that all sides and surfaces thereof are abraded.

Machines of this general type are widely used to clean the surfaces of metallic objects and a principal field of usefulness thereof is found in the removal of molding sand from castings and scale from forgings. As is well known the problem of adequately removing sand and scale from castings so as to prepare the surfaces thereof for further treatment, such as machining operations, plating, enameling, etc., is of foremost practical importance in modern practice. This is especially true where the work pieces are of intricate shape and complicated form, involving surfaces more or less hidden and hence not easily reached by the abrasive stream, as well as having comparatively weak sections subject to breakage if the tumbling action is too severe. This problem is rendered more difficult of solution by the dictates of present day production methods requiring a maximum output of satisfactory work with a minimum expenditure of time and labor, while economy further demands elimination of the breakage of objects being cleaned or the necessity of recleaning work by repeated cleaning operations.

It is therefore a major object of this invention to provide a novel abrading machine having means for subjecting objects to an improved tumbling action and for simultaneously exposing them to a suitably directed stream of abrasive, which will efficiently clean even the most intricate and delicate castings and the like without breakage.

A further object of my invention is to provide an improved abrading machine including means for causing the work to cataract or tumble upon itself through an abrasive stream first in one direction and then in the opposite direction so that a maximum change of position of the work with respect to the abrasive stream is obtained without undue drastic manipulation, whereby complete cleaning is assured and breakage is reduced to an absolute minimum.

Another object of my invention is to provide, in an abrading machine, a novel work supporting structure which is operable to produce a reversing tumbling action on the work supported thereby, and is also operable to permit ready loading and unloading of the machine.

A still further object of my invention is to provide, for use in connection with an abrading mechanism a flexible work supporting apron-like structure which is held in the form of an upwardly facing loop to form a trough-like tumbling chamber and which is movable alternately in opposite directions to produce a reversing tumbling action on objects contained therein and is also selectively positionable to provide a low side for loading objects or to entirely eliminate one side thereof for unloading objects therefrom under the action of gravity.

Another object of my invention is to provide, for use in a tumbling mechanism, improved work supporting elements, including readily replaceable sections, which are flexibly articulated so that opposite edges thereof may travel on suitable guides for movement along a curved path to form the wall of a trough-like work chamber and to provide means for reciprocating the elements along said path to alternately tumble objects contained therein in opposite directions, said means being also operable to selectively position one of the open ends of the element at predetermined points along said path to provide a low side on said chamber for loading or to entirely open one side of said chamber for gravitational unloading of objects therefrom.

A further object of my invention is to provide a novel tumbling mechanism comprising articulated elements and cooperating end members arranged to form the side and end walls of an upwardly facing trough-like tumbling chamber together with means for driving said end members so that a reciprocatory movement is given to said side walls to thereby produce a reversing tumbling action to objects contained within said chamber, said means being also operable to bring said chamber into loading and unloading positions.

Another object of my invention is to provide in a tumbling apparatus, an improved tumbling chamber in the shape of an upwardly opening trough formed in part by a flexible work supporting element, and made up of a plurality of articulated elements having their meeting edges resiliently held in overlapping relationship so that foreign objects may pass between their edges without becoming wedged therebetween.

A further object of my invention is to provide in a tumbling apparatus, a flexible work supporting element having suitable roller means cooperating with guide means, the guide means including curved main sections and cooperating branch sections together with means to selectively direct the rollers into or out of the branch means for selectively causing a portion of the element to fold back upon itself when it is moved to bring the tumbling chamber into unloading position.

A still further object of my invention is to provide an improved track means for guiding the rollers carried by a flexible work supporting element which is shaped to cooperate with said rollers so as to prevent abrasive from lodging therebetween.

It is also an object of this invention to provide in an abrading mechanism an improved and novel sealing means for preventing the entrance of dirt or abrasive into the several bearings thereof thereby reducing wear therein and lengthening the life of the machine.

In cleaning objects by means of a combined tumbling and abrading action wholly satisfactory results are not always obtained, especially where the objects are of intricate shape and/or of relatively delicate character, due to the difficulty of reaching hidden surfaces with the abrasive stream under the usual tumbling action or to the breakage of the objects by a too vigorous tumbling action resorted to in attempts to present all surfaces to the action of the abrasive. Most prior art devices fail in this respect principally because of inadequate tumbling or because of improper correlation of the tumbling action with the abrasive stream.

It is, therefore, a further object of my invention to provide an improved tumbling and abrading machine wherein a novel and improved tumbling action is given to the objects being cleaned with the same so correlated with the abrasive stream that all surfaces of the objects are presented to the direct action of the abrasive and thereby thoroughly cleaned, while the character of the tumbling is such as to not damage even the most delicate or fragile objects.

A further object of my invention is to provide a novel arrangement of tumbling chamber and abrasive propelling means whereby the abrasive stream is in the nature of a sheet extending longitudinally of the axis of the tumbling chamber, so that the tumbling action causes objects being tumbled to fall directly through said sheet.

A still further object of my invention is to provide a novel arrangement of tumbling chamber and abrasive propelling means of the character just described and which is adapted to bring about a reversing tumbling action on objects placed in the chamber so that the objects alternately fall through the abrasive stream in opposite directions.

An additional object of my invention is to provide a novel arrangement of tumbling chamber and abrasive propelling means of the type just described wherein the objects are caused to migrate axially of the chamber during tumbling and thereby lodging of the objects against the ends of the tumbling chamber is obviated.

It is a further object of this invention to provide an improved closure means, or door structure, for a tumbling mechanism, and novel operating means therefor whereby a minimum amount of time and labor is involved in operating the same to provide access to the tumbling chamber.

A still further object of this invention is to provide an improved closure means, or door structure, for a tumbling mechanism, including a simple but effective means for sealing the joint between the closure and casing proper to thereby prevent the escape of dust and/or abrasive from the tumbling chamber.

In mechanisms designed for cleaning objects by means of an abrasive stream an important feature is the provision of suitable means for handling the abrasive and also for removing dirt, dust and other refuse of a coarser character. This is particularly true of devices wherein the abrasive is of such a character as to be repeatedly used, since efficient operation requires that all foreign matter be taken from the abrasive after it is discharged from the tumbling or other type of work chamber before the same is returned to the abrasive propelling means for re-use.

It is therefore a further object to provide a novel and improved abrasive handling and cleaning mechanism adapted for use with abrasive machinery which is simple in construction, positive and efficient in operation and readily adjustable to different feed requirements.

It is another object of this invention to provide a novel abrasive cleaning mechanism wherein coarse refuse is positively separated from the spent abrasive prior to the final cleaning thereof and wherein finer and lighter foreign matter is finally removed from the abrasive by means of a current of air passing transversely across a freely falling, thin and evenly distributed stream of unclean abrasive.

A further object of my invention is to provide, in an abrasive cleaning and handling system, an improved device for separating coarse refuse, such as nails, particles of wire, etc., from the abrasive and being directly connected to and cooperable with a conveying means arranged to move spent abrasive from the work chamber of the abrasive machine.

A still further object is to provide an improved abrasive handling and cleaning mechanism wherein the several operative parts thereof are located at various vertically spaced levels, to cooperate with different parts of an abrasive machine, with suitable elevating means to convey the abrasive to said levels and wherein a common drive means is provided to operate the cleaning and handling devices.

Another object of my invention is to provide, in an abrasive handling and cleaning system, means for feeding abrasive to a propelling means, the feeding means being supplied from a quantity of abrasive stored within the system which is metered to the feeding means to control the abrasive stream from the propelling means, together with means associated with said feeding means for selectively by-passing the abrasive supplied to the feeding means back to said stored quantity when said propelling means is not operating.

Another object of my invention is to provide in an abrading machine a novel and improved abrasive cleaning device having suction means provided for drawing a current of air across an abrasive stream to clean the same with said suction means also associated with a work chamber to withdraw dust therefrom and with suitable regulating means to control the action of said suction means.

The foregoing and other objects will become apparent from a study of the following detailed description of a preferred embodiment of my invention when considered in conjunction with the appended claims and accompanying drawings wherein:

Figure 1 is a perspective view of a machine embodying my invention as seen from a point to the right, and in front of, the machine.

Figure 2 is another perspective view of the machine shown in Figure 1, taken from a point closer thereto and showing my improved tumbling mechanism in an unloading position.

Figure 3 is a further perspective view of the front of the machine taken at slightly different angle from that of Figure 2 and showing the tumbling mechanism in an intermediate position.

Figure 4 is a partial view in perspective of the front of the machine, similar to that of Figure 3 but taken from a point closer to the machine and showing my improved tumbling mechanism in another intermediate position.

Figure 5 is a perspective view of the rear of the machine showing the main drive and abrasive handling mechanism motors, a portion of the abrasive elevating means and the door counterweight.

Figure 7 is a schematic view of the main drive sprocket and controlling mechanism as viewed from the interior of the machine through a side wall thereof.

Figure 7a is a section through a portion of the control mechanism and drive sprocket taken on the line 7—7 of Figure 7.

Figure 8 is a vertical section through the machine showing the tumbling mechanism in detail with the abrasive propelling means shown in elevation and with the tumbling mechanism and conveyor motors omitted.

Figures 12 and 13 are detail views of a modified form of articulated work supporting structure.

Figures 14, 15 and 16 are detail views of another form of articulated work supporting structure.

Figure 17 is a detail view of the roller mounting for the articulated work supporting structure.

Figures 18 and 19 are detail sectional views of the tumbling mechanism coupling and bearing means.

Figures 20, 21, 22 and 23 are diagrammatic views of my improved tumbling mechanism illustrating the operation thereof.

Figure 24 is a diagrammatic view of a modified type of tumbling mechanism embodying the principles of my invention.

Figures 25, 26 and 27 are diagrammatic views of the tumbling mechanism shown in Figure 24 and illustrating the operation thereof.

Figure 6:
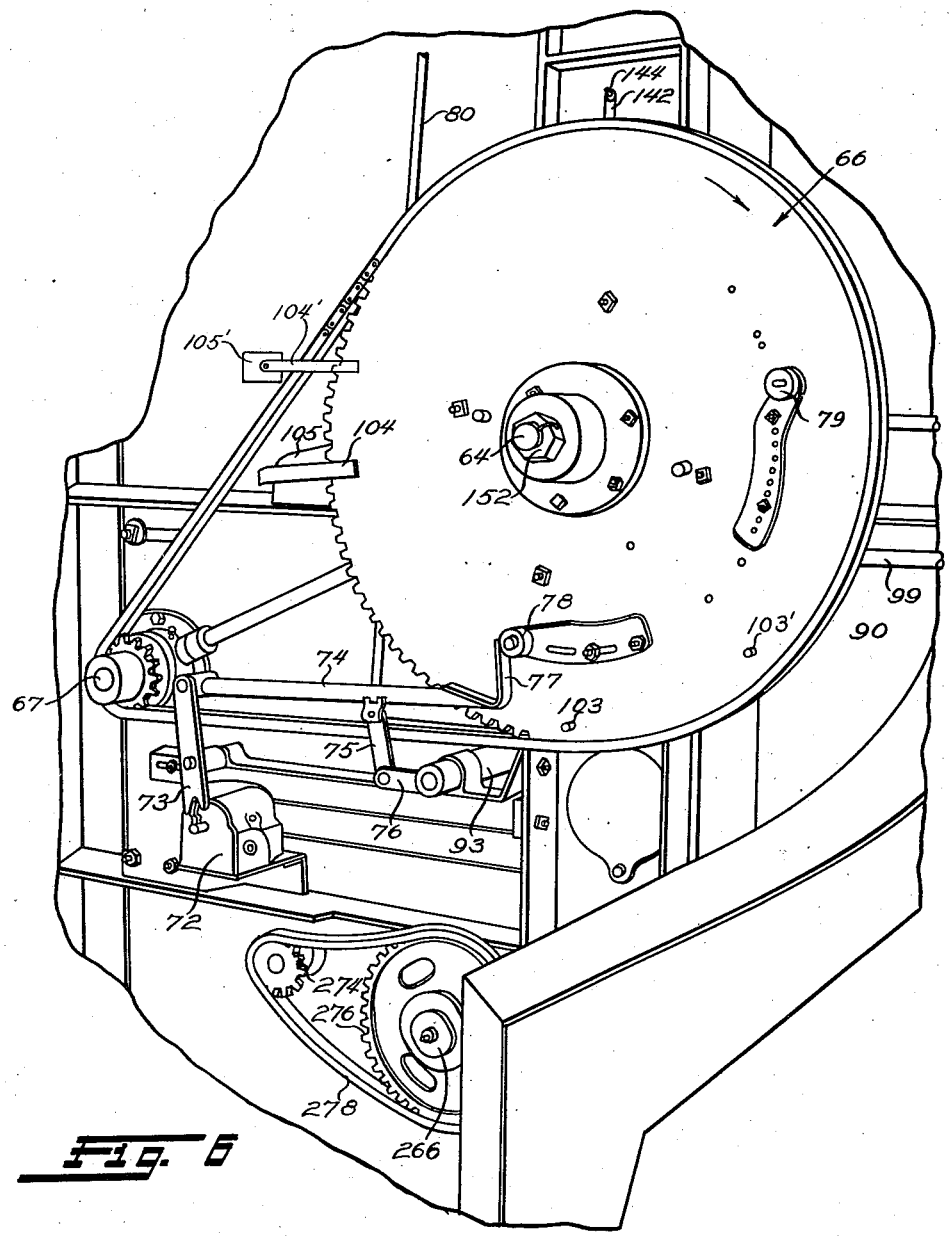
Figure 6 is a still further perspective view of the machine showing the left side thereof with a portion of the outer casing removed to expose the main drive sprocket and a part of the control mechanism.

Before proceeding with the detailed description of the complete machine the following outline of its salient features is presented to assist in the understanding thereof. My improved abrading machine comprises a tumbling mechanism, door mechanism, an abrasive handling, cleaning and storing mechanism and an abrasive propelling mechanism. Following a brief discussion of the machine as a whole these units will be taken up separately and described.

Referring now to the drawings wherein like reference characters are used to designate the same parts, wherever they appear, and with special reference to Figure 1, the machine consists of a main supporting structure, designated generally by reference character 1, surrounded by a casing structure 2, and having spaced side-walls 3, arranged to form with the casing 2 a chamber 4. A tumbling mechanism, indicated generally at 5, is arranged within the chamber 4. An elongated opening 6 closed by a door or closure 7 located on the front of the device provides access to the chamber 4 and tumbling mechanism 5. An abrasive propelling mechanism 8 is supported on the frame directly above the tumbling mechanism, see Figures 8 and 11, on cross members 9, 10 and 11 which also serve to brace the frame members 1—1. As will be explained later the tumbling mechanism provides a generally trough-like chamber, opening upwardly, into which the abrasive stream from the mechanism 8 is projected.

Figure 9:
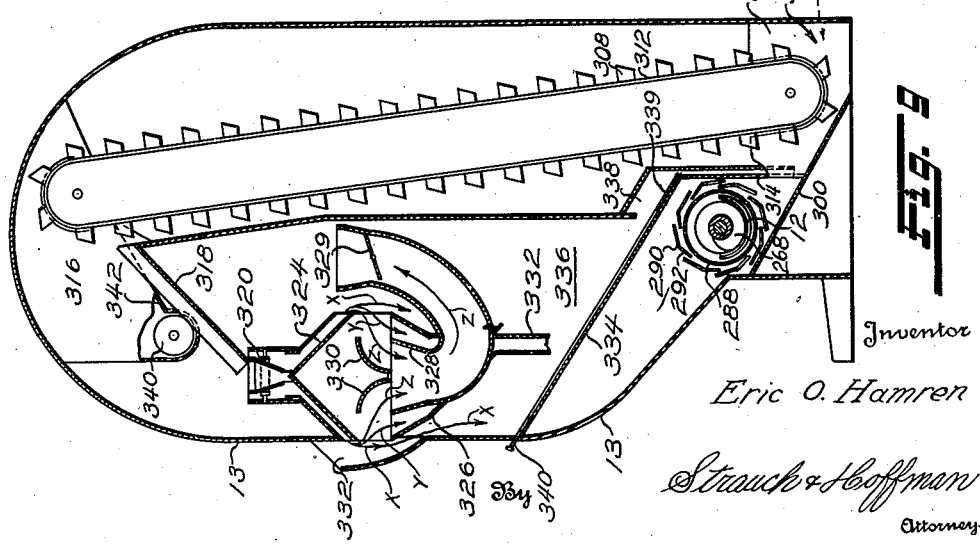

The right-hand portion 13 of the casing 2 houses an abrasive handling and cleaning apparatus, shown in detail in Figures 9, 10 and 11, which operates to take abrasive collected in a trough-like section 12, Figure 8, of casing 2 located below the tumbling mechanism 5, clean the same and return it to the propelling means 8. Mounted on casing 2, see Figure 2, to the left of the opening 6, are switches 14, 15, 16, controlling the electric drive means for the tumbling, abrasive handling and abrasive propelling mechanisms, and also a manual control lever 17 for the tumbling mechanism. Leading into the top of the machine is a pipe 18, Fig. 1, connected to a suction device, not shown, for withdrawing dust from the chamber 4 and also for creating an air current utilized in one of the abrasive cleaning steps to be described later. The left hand portion 19 of the casing houses the drive means for the tumbling mechanism 4. As is seen in Figure 5 the tumbling mechanism and abrasive handling and cleaning mechanism motors are housed in the rear portion of casing 2 directly back of the chamber 4. Portion 13 of housing 2 also encloses the door counterweight mechanism.

*Tumbling mechanism*

Referring particularly to Figures 1, 2, 3, 4, 8, and 11, the tumbling mechanism will now be described. Mounted on side-walls 3—3 are arcuate track members 20—20 having their centers of curvature aligned; and journalled for rotation in bearings to be described later and which are shown in detail in Figures 18 and 19, are circular end plate members 21—21, spaced slightly from the side-walls 3—3 for a purpose later explained, and also spaced from each other a distance substantially equal to the width of chamber 4.

Extending between plates 21—21 and rigidly secured thereto is an arcuate plate 30 to the opposite longitudinal edges of which are pivotally attached a series of articulated plate elements 22—23—24—25. As is seen in Figure 8, branch track means 26 and 27 are carried by the frame structure to cooperate with the ends of track members 20—20, through pivotally mounted track switch means 28—29, so that in certain positions of the tumbling mechanism selected portions of the articulated plate elements 22, 23, 24, and 25 may be guided thereby as will hereinafter be explained. Plate elements 22—23—24—25 extend between end plate members 21—21 so that a trough-like receptacle or chamber is formed thereby, Figures 20, 21 and 22 diagrammatically illustrating this feature.

Plates 22—22 are secured to rods 32—32, by means of angles 33 and bolts 34, while the rods 32—32 are journalled in bearings 35—35 secured to plate 30 by bolts 36—36. At their opposite edges plates 22—22 are secured to rods 37—37 by screws 38—38. Plates 23 and 24 are likewise secured at one edge to similar rods 37—37. The opposite edges of plates 23 and 24 rest on the adjacent edges of plates 22 and 23 respectively and are resiliently held in contact therewith in the following manner. Angle members 39—39 are suitably secured to the under side of plates 23 and 24 and held against the projecting flanges of angles 39—39 are clip members 40—40. These clip members are attached to the aforementioned flanges by bolts 41, nuts 42 and resilient washer elements 43, see Figure 3. The resilient character of the washers 43 will permit plates 23 and 24 to move away from the adjacent plate for a slight distance and sufficiently to permit foreign matter to pass through without binding or "jamming."

Plates 25 are secured at one edge to rods 44 by bolts 45—45 while their opposite edges are held against the adjacent edges of plates 24—24 by elements 39, 40, 41, 42, 43, in the same manner as plates 23 and 24 are held against plates 22 and 23 respectively.

Rod members 37 and 44 are provided at each end with roller elements 46 which are journaled on suitable bearings carried by the outer ends of gudgeons 47 mounted in the ends of said rod members, see Figure 17. A sealing member 48 engages the roller 46 to prevent the entry of dust and abrasive to the bearings thereof. Rotatably mounted on a bearing surface 49 of the gudgeon 47 is a bushing element 50 to which is secured link members 56 having offset ends 51—52 connecting the several rod members 37 and 44. The cooperating surfaces of bushing 50 and bearing 49 are tapered to provide an automatic centering of rods 37 and roller assemblies 46 when these rods are moved by the links 56 during operation of the machine. The inclinations of these tapers are relatively slight and sufficient clearance is provided to permit assembly by slipping bushing 50 over bearing 49. The link end 51 is welded to a sleeve 53 on the outer surface of which the link end 52 is rotatably mounted. In this manner the rods 37 and 44 are flexibly joined and plates 22, 23, 24, and 25 held in operative position. A flange member 54 is secured by dowels 55 to the rods 37 and 44 with its outer face spaced from the link 52 for a purpose to be described later.

As will be seen in Figure 8, plate members 21 are provided with notches 55 and when either of the series or flights of plates 22, 23, 24 and 25 is wrapped around these members, the exposed surfaces of sleeves 53 are received by said notches. These notches have arcuate side-walls struck from the next adjacent notch as a center to permit the sleeve 53 to readily enter and leave said notches on articulation of the plates 22, 23, 24, and 25. Rollers 46—46 are thus positioned between the side-walls 3—3 and the circular end plates 21—21 and serve to support and guide the two series or flights of articulated elements on the track means 20—20 for movement in a curved or arcuate path. The side of the track 20 contacting rollers 46—46 is preferably formed with a curved surface 56a, see Figure 11, to prevent abrasive from lodging thereon during operation of the machine.

From the foregoing it will be seen that end plates 21—21, plate 30, and the two flights or series of articulated plates 22, 23, 24, and 25 form a tumbling chamber 5 which is generally trough-like in shape and which opens upwardly. As the plates 22, 23, 24, and 25, as well as the plate 30, are operatively secured to the end plates 21—21, rotational movement of the end plates will cause the articulated plates to move in a curved path as guided by the tracks 20—20. It will be understood that any other equivalent means may be employed to form the end walls of my tumbling chamber in place of the rotatable plates 21—21 and that the same may be entirely eliminated by arranging the casing walls 3—3 to cooperate directly with the articulated work supporting structure.

Referring to Figures 8 and 20 to 23, the operation of this tumbling mechanism is as follows. Assuming that plate 30 is positioned as shown in Figure 20, by suitable rotation of heads 21—21, then the two flights of articulated elements take the position shown in this figure. The switches 28 and 29 are swung to the dotted line position of Figure 8, so that portions of the flights will be received and guided by the branch track means 26 and 27 as will be readily understood. It is also to be noted that the switches 28 and 29 will now guide the rollers 46—46 into and out of the branch track means.

Now if a reversing rotational movement is given to the members 21—21, with the points of reversal suitably timed, the separate flights of articulated elements will be alternately projected and withdrawn from their respective branch track means as illustrated by Figures 21 and 22. During this time the longitudinal side-wall of the tumbling chamber, formed by elements 30, 22, 23, 24 and 25, will be given a reciprocatory movement along a curved or looped path so that the trough-like character of the tumbling chamber is at all times maintained. The elements 30, 22, 23, 24, and 25 in effect form a flexible work supporting structure and with end elements 21—21, or their equivalents, a tumbling chamber. As will be obvious, objects placed within this chamber will, upon movement of the end elements 21—21 as above set forth, be given a reversing tumbling action as schematically depicted by the arrows in Figures 20, 21 and 22.

Thus if a sheet-like stream of abrasive A is directed into the chamber with its plane coincident with the longitudinal axis of the same, the objects will be alternately tumbled or cataracted directly through said stream in opposite directions. This kind of tumbling action assures that all the surfaces of the objects will be directly presented to the abrasive stream in a minimum length of time. Furthermore, the tumbling action is such as to effect proper cleaning without necessitating drastic treatment of the work, whereby breakage is considerably reduced.

To further enhance this tumbling action the end plates 21—21 preferably are provided with cleats 57—58, see Figures 2 and 4, which will cause the objects to tumble or cataract generally towards the middle of the chamber thus bringing them in contact with the most effective portion of the abrasive stream, and will prevent lodging of the objects against the end plates.

In order to load the machine the movement of the head is stopped by a control mechanism, hereinafter described, and the machine is then manually controlled to bring the parts into the position shown in Figure 22, or substantially as shown in Figure 8. The objects to be cleaned are dumped from a suitable mechanical loading device, or placed by hand into the tumbling chamber. When it is desired to discharge objects from the tumbling chamber, end plates 21—21 are caused to assume the position shown in Figure 23 (see also Figure 2). The drive mechanism control device is so arranged that when plate 25 reaches a point just beyond the position shown in Figure 22 and just ahead of the position shown in Figure 8, assuming plate 21 to be rotating counter-clockwise, the switches 28 and 29 are swung to the solid line positions of Figure 8. Thus the right hand flight of articulated elements is withdrawn from the branch track 26 and folded back on the plate 30 as shown in Figure 23.

As will be observed the edge of plate 25 is now at the bottom of the curved or looped path formed by tracks 20—20 and the objects contained in the tumbling chamber fall by gravity therefrom. After unloading, the heads 21—21 are rotated in a clockwise direction to the position of Figure 22, or any other desired position, and the chamber again loaded as above described. To restore the mechanism to tumbling condition, the control lever 17 is operated to bring the automatic drive means into actuation, as will now be explained.

The drive and control means for imparting the movements just described to the heads 21—21 will now be set forth. Referring first to Figures 18 and 19, end plates 21—21 are made up of an assembly of three plates 60, 61, 62 of increasing diameters, see Figures 1 and 2. One of these assemblies is connected by a coupling means 63 to a shaft 64 journalled in plate or side-wall 3 by a bearing structure 65. The other assembly is journalled by a bearing 65' on a stud 64', mounted in side-wall 3. The details of these coupling and bearing structures are shown in Figures 18 and 19 and will be described later. Fixed to the end of the shaft 64 is a sprocket wheel 66. As will be remembered plates 21—21 are joined by plate 30 and hence will be rotated together by sprocket 66.

Turning now to Figure 6 the normal drive operation, i. e. a reversing rotation of sprocket 66 and hence plates 21—21, between the extreme positions of Figures 21 and 22, will be described. A shaft 67, which drives sprocket 66 through the chain-drive shown in Figure 6, is driven by a motor 68, through a reduction gear 69 and a flexible coupling 70 (Figure 5). A reversing switch 72 operated by a lever 73 is connected into the circuit of motor 68. The lever 73 is actuated through a linkage 74, 75 and 76 by engagement of the projecting end 77, of link 74, with rollers 78 and 79, adjustably mounted on the outer surface of sprocket 66. Rollers 78 and 79 are so positioned that the rotation of the motor 68, and hence plates 21—21, is reversed at the extreme limits of travel of the flexible work supporting structure, comprising plates 30, 22, 23, 24, and 25, shown in Figures 21 and 22. Thus, in this normal operation the sprocket 66 oscillates between these points as determined by the position of rollers 78 and 79. The angular amount of such oscillation, and consequently the linear extent of travel of the flexible work supporting structure, can be readily varied by suitably adjusting rollers 78 and 79 with respect to sprocket 66. Throughout the normal tumbling action just discussed the track switches 28 and 29 remain in the dotted line position of Figure 8, and the right and left hand flights of articulated elements are alternately projected into and withdrawn from their respective branch track portions 26 and 27.

In Figure 7, the track switch operating mechanism and manual control means for the drive mechanism is shown. In this view, which is somewhat schematic and discloses all of the structure as it would appear if viewed from within the casing looking through the wall 3 towards the left hand side of the machine, the track switches 28 and 29 are shown in solid line when in normal tumbling position and in dotted lines when in a position to permit the bringing of the tumbling mechanism into dumping position, as shown in Figure 23.

The track switch operating mechanism comprises a rod 80, bell-crank 81, rod 82, lever 83, shaft 84, rod 85, bearing 86, link 87, lever 88 and shaft 89. Switches 28 and 29 are positioned within the chamber 4, as can be seen in Figures 3, 4 and 8, with the shafts 84 and 89 suitably journalled in sidewall 3 and a false wall 90, spaced from wall 3. The levers 83 and 87, rods 82 and 85 and portions of bell-crank 81 cooperating with said rods are likewise located between walls 3 and 90 and hence do not appear in Figure 4. Rod 80 is beyond wall 90 and is therefore seen in Figure 6. A spring 91, secured to the rod 85 by the element 92, is tensioned so as to urge the mechanism, and hence switches 28 and 29, toward the solid line position of Figure 7.

Secured to one end of rod 80 is lever 93, having a bifurcated portion 94 in which is pivotally mounted an arm 95, carrying a cam roller 96. Lever 93 is fixed to shaft 97 which also carries lever 76. Spring 98 tends to urge arm 95 away from sprocket 66 and in a clockwise direction as viewed in Figure 7a. A control rod 99, operable by a crank 100, carries a cam 101 engaging the side of arm 95 by means of which the arm 95 can be pivoted into the solid line position of Figure 7a. Normally, however, the rod 99 is turned to bring the cam 101 to the dotted line position of Figure 7a so that arm 95 swings away from the sprocket 66 thus placing roller 96 out of the path of movement of a cam element 102, mounted on sprocket 66.

The rollers 46—46 being duplicated on each side of the articulated elements 22, 23, 24, 25, a similar set of switch elements 28—29 is provided on the right-hand side of the machine. In order to operate this set of switches, the shaft 106, on which bell-crank 81 is secured, extends across the machine and projects through the casing section 13, see Figure 1. The switch control levers 83' and 88' are actuated from shaft 106 by bell-crank 81'—81', rod 85', link 87' and spring 91' (see Figure 1).

With the rod 99 in the position just described, switch 14 is arranged, through a control switch 110, actuated by crank 100 and toggle 111, and suitable electrical means, not shown, to remain in a "closed" or "on" position. Thus the motor 68 is energized and sprocket 66 oscillates in the manner previously described and under the control of reversing switch 72, through the medium of rollers 78 and 79 and elements 73, 74 and 77. This constitutes the "automatic" position of rod 99 and crank 100.

Angular movement of rod 99 by crank 100 sufficient to position cam 101 midway between the two positions shown in Figure 7a, swings arm 95 towards the sprocket 66 but not far enough to bring roller 96 into the path of cam 102. This movement of rod 99 operates the control switch 110 so as to open the circuit to switch 14 and hence to the motor 68. This is the "off" position, as all circuits are open. Crank 100 may therefore be operated to permit the tumbling mechanism to be stopped at any position between the limits shown in Figures 20, 21 and 22.

Further angular clockwise movement of rod 99, by crank 100, brings cam 101 to the solid line position of Figure 7a and also swings the arm 95 so as to position roller 96 into the path of movement of cam 102. The control switch 110 now connects switch 14 to the motor and arranges the same to operate as a "start-stop-reversing" switch, i. e. pushing on the lower button thereof will cause the tumbling mechanism to move in one direction toward dumping position, while pushing on the other button will cause movement in the other direction. In each case movement continues only so long as the respective button is maintained depressed. This is the "hand position."

It will now be observed that with the lower button depressed, when sprocket 66 approaches the normal reversing position of Figure 22, traveling in a counter-clockwise direction, as viewed in Figure 7, roller 96 is engaged by cam 102. Continued movement of sprocket 66 swings arm 95 and likewise arm 74 into the dotted line positions of Figure 7. Hence reversing switch 72 will not be actuated and rotation of sprocket 66 will continue, as long as the button is pushed, until the parts assume the position of Figure 23 at which point a pin 103 strikes arm 104 of an automatic stop switch 105, see Fig. 6. If desired, however, especially if the work is of an extremely fragile nature, the lower button may be alternately depressed and released so as to effect the discharge in stages.

The foregoing movement of arm 95 also actuates linkage 80, 81, 82, 85, and 87 to throw track switches 28 and 29 to the dotted line positions of Figure 7 and this action is timed so as to occur just before the lowermost roller 46, of the right hand flight of articulated elements, reaches the position shown in Figure 8. Thus upon continued rotation of sprocket 66, as above set forth, the right hand flight of articulated elements is withdrawn from branch tracks 26—26 and folded back upon plate 30 in the manner illustrated in Figure 23. Switches 29—29 are now positioned, as shown in dotted lines in Figure 7, and thus provide a clearance passage for rollers 46—46 during this folding action.

Pushing on the upper button of switch 14 will cause a reverse rotation of sprocket 66 and as this proceeds roller 96 will eventually leave the beveled end of cam 102 whereupon spring 91 will return the track switches to their normal positions, see solid lines Figure 7 and dotted lines Figure 8. Also, the arm 74 is now swung back into a position to bring its end 77 into the path of rollers 78 and 79. However, before roller 79 reaches a position to contact end 77 a second stop or limit switch 104' and 105' is operated by pin 103' and this reverse rotation ceases. Now the lower button is pushed and the sprocket rotates back towards dumping position. As the loading position of Figure 22 will be reached before pin 103' engages switch 104'—105' rotation normally does not proceed to this extent and this second stop switch merely serves to stop rotation when loading position has been inadvertently passed. As one button will, as above explained, move the tumbling mechanism towards unloading position while the other moves it towards loading position, these buttons may conveniently be labelled accordingly.

A complete cycle of operation will now be described. Assuming that rod 99 and crank 100 are in the "automatic" position, which will be attained when crank 100 is in the extreme left, as viewed from the front of the machine, and that the tumbling chamber is charged with a load of castings or other similar objects, the switch 14 is now in "closed" or "on" position and motor 68 energized. Sprocket 66 oscillates, as above described, with track switches in normal position and the load is alternately tumbled in opposite directions by the reciprocatory action of the tumbling mechanism. During this time switches 15 and 16 are closed to cause the abrasive propelling means and the abrasive handling and cleaning mechanism to operate, thus subjecting the tumbling objects to a stream of abrasive.

When the cleaning operation is completed the switches 15 and 16 are opened, thus stopping the abrasive stream and the crank 100 is placed in "off" position. This opens all circuits and stops the tumbling mechanism. The door is then preferably opened so that the operation of the tumbling mechanism may be observed. Now the lower button of switch 14 is pushed, and sprocket 66 caused to rotate in a counter-clockwise direction, as viewed in Figure 7. If desired, this rotation may be continued until the parts assume the position of Figure 23, as determined by stop switch 105, at which point the objects will gravitate out of the tumbling chamber into a suitable "tote" or other container. Or, if desired, the objects may be gradually discharged by causing the tumbling mechanism to be "stepped" towards dumping position by periodically pushing and releasing the "unload" button, as previously described.

In either case the tumbling chamber will eventually assume the position of Figure 23 and all the objects will be discharged therefrom.

Now the other or "load" button is pushed thus effecting clockwise rotation of sprocket 66. This is continued until the end of the articulated work supporting structure reaches the desired loading position, which will vary with different types of work and work handling devices, but which will be somewhere between the limits of Figures 22 and 23. If the desired point is passed the finger is removed from the "load" button and the "unload" button momentarily depressed, thus causing the tumbling mechanism to return to the desired loading position.

With the mechanism in the loading position, a fresh charge of work is loaded into the chamber, either by hand or by means of a mechanical device, the door 7 is closed and the crank 100 placed in "automatic" position whereupon tumbling action takes place in the manner previously described.

From the foregoing it will be seen that my improved tumbling mechanism provides a trough-like tumbling chamber, which in normal operation tumbles the work in opposite directions and which can be selectively placed by the control means in loading and unloading positions.

Figure 21A:
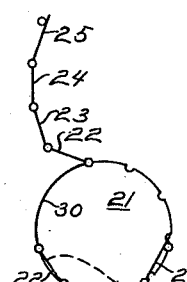
Figures 21a and 22a are diagrammatic views similar to Figures 21 and 22 illustrating a slightly modified operation of the tumbling mechanism.
Figure 22A:
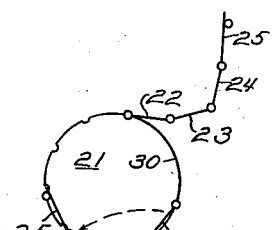

In the foregoing description of the operation of the tumbling mechanism reference has been made to Figures 21 and 22 as showing the extreme limits of travel of the work supporting structure. However, it is possible, by suitably adjusting the rollers 78 and 79, see Figure 6, to give an increased length of travel to the work supporting structure such as is shown in Figures 21a and 22a. It will, of course, be appreciated that the ends of the work supporting structure must not, during normal tumbling action, be brought too far below the axis of rotation of the heads 21—21 thereby permitting the work to spill out of the tumbling chamber. By reference to Figure 8 it will be seen that the switches 28 and 29 are arranged so that in tumbling position, see dotted lines, this increased extent of work supporting structure travel is possible.

Referring to Figures 18 and 19 the preferred means for mounting head members 21—21 will be described. The back plate 62 of the left-hand member 21 is suitably secured to a plate 120 which carries studs 121, connected at their outer ends by a ring 122. A flange 123 keyed at 124 to shaft 64, is provided with an annular series of openings 125 through which studs 121 project. Resilient elements 126 of rubber or the like are interposed between studs 121 and the inside surfaces of holes 125 to provide a resilient coupling between shaft 64 and plate 62. Shaft 64 is journalled in a bearing structure indicated generally by reference character 65 and which comprises a flanged supporting sleeve 128 secured by bolts 130 to the end wall 3. Fixed within sleeve 128 is a second sleeve 132 carrying at its ends anti-friction bearing elements 134, provided with sealing means 136 and 138, and spaced by element 140.

A lubricant supply pipe 142 is connected to the space between sleeves 132 and 140 and extends upwardly above sprocket 66, see Figure 6, where it terminates in a lubricant fitting 144. Sealing elements 146 and 148 are carried by the flange 123 and sprocket 66 to further protect the bearings 134 and 136 from dust or abrasive. Sprocket 66 is secured to a tapered portion 150 of shaft 64 by a nut 152.

The right-hand end plate 21 is similar to the left-hand plate, being built up of plates 60, 61 and 62, the latter of which is secured to a plate 154 which carries a hub element 156 in which is fixed an anti-friction bearing 158. The inner race of this bearing is secured to the end of stud 64' by bolts 160 while sealing devices 162 and 164 are interposed between hub 156 and a portion of stud 64'. A further sealing element 166 carried by stud supporting structure 168 engages the outer surface of hub 156. Bolts 170 secure the structure 168 to the plate 3. Plate elements 60 and 61 are secured to plates 62—62 by screws 172 (see Figure 4) so that these elements may be readily removed and replaced when worn.

In Figures 12 and 13 a modified form of articulated work supporting element is shown, Figure 13 being a perspective view of the bottom side of the modified element. A plurality of similar plate sections 180 are secured together and to an elongated angle member 182 by screws or bolts 184 extending through flanges 186—188. At one end the flanges 188 are provided with matching U-shaped bearing forming portions 190. When assembled in the machine a second angle member 192 is secured to the member 182, as shown. In use these fabricated plate elements take the place of plates 23—24—25 and the U-shaped bearing elements fit over the shafts or rods 37—37 while the extending flange portions of the angle members 182—192 engage the next adjacent plate and the underneath portion of rod 37 in the same manner as the ends of plates 23—24—25, the clips 40 and the rods 37 interengage. However, when parts have become sufficiently worn, selected sections of this modified work supporting element can be replaced without replacing the whole element.

To replace a worn section, angle members 182 and 192 are released from the flanges 188 and the worn plate from the other plates by removing screws or bolts 184—184. The worn section is now swung about the rod 37 as an axis to a position where it may be lifted from the rod, i. e. when the bearing 190 clears the flange 182 of the next adjacent plate member, a new section is substituted for the worn section, swung back into place, the angle members 182—192 again secured to the flange section 188—188, and the new plate member secured to the other plate members by screws 184.

Although plate members 180—180, as well as plate members 22, 23, 24, 25, and 30 are made of a metal highly resistant to abrasion, as in the case of all other elements of the tumbling mechanism likely to be worn by the abrasive, even such material eventually wears and the present form of articulated work supporting element enables replacement of worn sections in a short time and with little trouble.

In Figures 14, 15 and 16 a still further modified form of articulated work supporting member is shown. Plate members 194 and 196, which correspond to the plate members 22, 23, 24 and 25 of Figure 8, are secured by screws 198—200 to elongated strips 202—204. The strip 202 is welded at 206 to a rod member 208 which takes the place of rod members 37—37 and is provided on each end with a roller structure, not shown, but which is similar to that disclosed in Figure 17. A sleeve 210 is keyed to each end of member 208 inwardly of the roller structure and is provided with an annular groove 212 which engages the outer peripheral edge of plate 21 at the notches 55 in the same manner as the space between the flange 54 and link end 52 of the structure shown in Figure 17, explained above. Strip 204 is welded at 214 to a semi-cylindrical element 216 in which is positioned the rod member 208.

Rotatably mounted on portions of the sleeves 210, are locking sleeves 218 carrying at one edge a semi-cylindrical flange 220. These flanges 220 overlay the ends of the element 216 and lock rod 208 within the semi-cylindrical member 216 so that a hinged joint is formed flexibly connecting the plates 194—196. The sleeves 218 are held in operative position by any suitable means such as set screws, not shown, which may be readily loosened to permit turning of the sleeves 180° from the position shown. When thus turned the member 216 is released from the rod 208 and the plates 194—196 may be separated. It is also noted that the plates 194—196 may also be removed by taking out the screws or bolts 198—200.

The various plate members 22, 23, 24, 25, 30, 180, 194 and 196, above described, are preferably shaped as shown and are all provided with suitable apertures as at 230, Figure 2, to permit the escape of abrasive, dirt and other refuse from the tumbling chamber formed thereby. As plate 25 is not, in the normal tumbling action, positioned at the bottom of the chamber, no holes or apertures need be provided therein. Likewise this plate can be flat, as shown, instead of curved like the remaining plates.

*Abrasive propelling mechanism*

Figure 11:
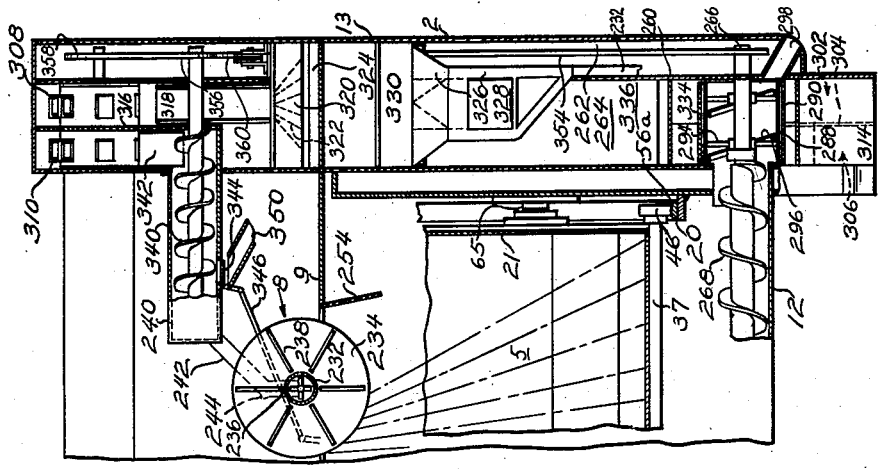
Figures 9, 10 and 11 are sectional views of the machine showing the abrasive propelling, handling, cleaning and storing mechanism.

As has previously been noted and as is shown in Figures 8 and 11 the abrasive propelling mechanism is positioned above the open side of the trough-like tumbling chamber 5 and is arranged to project a sheet-like stream of abrasive thereinto. While any suitable blast device, such as one or more compressed air blast nozzles, or any type of centrifugal wheel may be used with my apparatus, the following blast wheel is preferably employed for projecting abrasive against the work.

Referring to Figures 8 and 11, the propelling mechanism 8 comprises a stationary but adjustable internal sleeve 232 disposed axially of a wheel 234 and is provided with an abrasive discharge slot 236. Located within sleeve 232 is an impeller mounted for rotation to discharge abrasive through the slot. The abrasive is fed to sleeve 232 from a feeding mechanism 240 through duct 242 and spout 244. Blades 238 located radially on the wheel 234 pick up the abrasive discharged through the slot 236 and impart velocity thereto discharging the same from the wheel as shown by the blast lines in Figure 11. The wheel mechanism is driven by a shaft 246, supported in a bearing structure 248, operatively connected to a motor 250 by V belts 252. Switch 15 controls the motor 250.

As blades 238 all rotate at equal velocity and as abrasive picked up by the inner ends of the blades at slot 236 has a fixed velocity, it will be appreciated that abrasive will travel outwardly over blades 238 and will be discharged from each blade at approximately the same position on the circumference of the wheel, thereby producing a centrifugal abrasive blast having a fixed discharge point.

By suitably correlating the plane of rotation of the wheel 234, the location of slot 236 and the speed of the wheel, the abrasive blast may be directed as shown in Figure 11. When so directed the stream is projected into the tumbling chamber 5 and coincides with the longitudinal axis thereof. At the point of intersection of the sheet-like stream with the articulated work supporting structure, the width of the stream is approximately equal to the width of the supporting structure so that the abrasive blast does not directly impinge upon head elements 21—21. Figure 11 does not show the entire width of the stream but it will be understood that it extends substantially equally on each side of a vertical plane through the center of tumbling chamber 5. By thus preventing direct impingement of the abrasive stream on head elements 21—21, wear thereof is greatly reduced.

It will also be noted that the abrasive blast is in the nature of a sheet directed longitudinally of the tumbling chamber and that the reverse tumbling action produced on objects contained in said chamber, in the manner previously described, will cause these objects to fall or cataract directly through this sheet-like stream in opposite directions. This is an important feature of my invention for by providing this sheet-like stream of abrasive and by tumbling the work therethrough in opposite directions, a very greatly improved and highly efficient abrading and cleaning action is produced.

Due to the highly effective action of this arrangement the tumbling action itself may be relatively gentle while at the same time all faces and surfaces of the work are presented to the abrasive blast. This permits intricate and delicate castings to be fully cleaned without breakage thereof as would be the case if subjected to severe tumbling action. It will be observed that by regulating the speed and extent of rotation of end plates 21—21 of the present device that the character of the tumbling action may be readily controlled to suit the requirement of different objects.

Guard plates 254—254 serve to direct stray abrasive into the tumbling chamber and away from the heads 21—21.

*Abrasive handling, cleaning, and storing mechanism*

Referring to Figures 8, 9, 10, and 11, the mechanism for handling, cleaning and storing abrasive will be described. As previously noted the right-hand portion of casing 2 is enlarged to form a section 13. A vertical partition 260 divides this section into two compartments 262—264, see Figure 11. The trough-like portion 12 of the casing 2 communicates with compartment 264, as is seen in Figure 11, and driven by a shaft 266 is a screw conveyor 268 located in portion 12 and directly underneath tumbling mechanism 5.

Shaft 266 is driven by a motor 270 through reduction gear 272, sprockets 274—276 and chain 278, see Figures 5 and 6. Dirt laden abrasive discharged from the tumbling mechanism is directed by a curved wall section 280 of the casing 2, and an inclined plate 282, carried by door 7, to the portion 12 of the casing 2 and hence to conveyor 268, see Figure 8. An inclined plate 284, utilized in discharging work from the tumbling chamber 5 is also perforated as at 286 to prevent abrasive from lodging thereon.

Fixed to shaft 266 adjacent to the discharge end of conveyor 268 is a coarse refuse separating device comprising a cylindrical screen 288 carrying imperforate angled plates 290 spaced from its outer periphery by flanges 292. Screen 288 is mounted on spokes 294 and has a screw conveyor 296 secured on the interior thereof. Abrasive discharged by conveyor 268 is received by said screen and all but the coarser refuse passes therethrough. Angled plates 290 prevent nails or bits of wire from becoming lodged in the screen 288 in the following manner.

Assuming that a bit of wire, or a nail, starts to fall through the screen, it will be arrested by a plate 290. Now when this particular plate reaches the uppermost point in its rotary movement, the wire or nail will fall back into screen 288. Conveyor 296 eventually discharges all such coarse refuse from the right-hand end of screen 288 and into a chute 298 which opens outwardly of the machine and discharges the same into a suitable receptacle.

As will be evident the abrasive and fine dirt will be discharged from the plates 290 as they revolve. An inclined plate 300 catches this dirt laden abrasive and directs it into compartment 302, formed in the lower part of compartment 264 by a partition member 304. This partition member also cooperates with casing 2 to provide another compartment 306 located inwardly towards the tumbling chamber 5, as can be seen from Figure 11. Extending into these two compartments 302—306 are parallel runs of bucket conveying elements 308—310 mounted on a common belt 312. The partition 304 is shaped to fit between these two runs, as can be seen in Figure 9. A front wall 314 cooperates with plate 300 to prevent dirty abrasive from entering the compartment 306.

Cooperating with the upper end of the belt 312 is another partition member 316 serving to direct dirty abrasive thrown from buckets 308 onto an inclined plate 318. A V-shaped trough structure 320 receives this dirty abrasive from plate 318 and is provided with inclined partition members 322—322 which distribute the dirt laden abrasive into a sheet-like stream. Positioned directly under this stream is a roof-like structure 324 onto which the abrasive is discharged and by means of which it is separated into two thinner sheet-like streams falling from the lower edges of the structure 324.

A rectangular-shaped sand chute 326 is arranged with its outer edges substantially vertically under the "eaves" of the roof structure 324 and within this chute 326 is a suction pipe 328 opening upwardly towards the same. Deflector plates 330—330 are positioned directly above the pipe 328. Casing 13 is provided with an opening 332 adjacent the chute 326 and pipe 328. Pipe 328 is connected to suction pipe 18, Figure 1, which, as has been previously noted, is arranged to draw air out of the tumbling chamber 4. Suitable draft regulating means 329 are provided in order to control the force of the air current which will be drawn into the pipe 328. Similar regulating means, not shown, is also provided in connection with the working chamber suction pipe.

The operation of the above described cleaning apparatus is as follows. The sheet-like streams of abrasive, represented at X, Figure 9, contain fine particles of dust and mould sand, and as the current of air drawn into the pipe 328 passes through these streams these particles, being relatively light as compared to the abrasive, will be deflected out of their freely falling paths, as indicated at Y and Z, Figure 9. The amount of deflection will be proportional to the specific gravities of the particles and as the sand is heavier than the dust it will take a path represented by the arrow Y while the dust path is along the arrow Z.

The heavy abrasive is not deflected to any great extent by the air current and therefore falls along a path represented by the arrow X. The sand falls into the chute or hopper 326 from which is conveyed to the exterior of the machine by means of a suitable duct 232. The dust is drawn into the pipe 328 and thence to the duct 18 which is in communication with a suitable dust separating mechanism, not shown. The cleaned abrasive falls into the chamber 264 onto an inclined plate 334. This portion of the chamber 264 thus forms a storage space 336 for clean abrasive.

As will be readily understood by properly regulating the velocity of the air current as well as the relationship of the chute 326 and pipe 328 with respect to each other and to the lower edges of the roof-like structure 324, that a complete separation of dust and sand from the abrasive as well as from each other will be effected. By dividing the stream of dirty abrasive into two separate streams of considerable width, but of minimum thickness, this cleaning action is greatly enhanced. Furthermore, by directing the air current across these sheets, in a direction perpendicular to the path of these freely falling particles, a maximum separating effect is produced. This cleaning mechanism assures absolute freedom of the cleaned abrasive from foreign matter, a condition highly desirable from the standpoint of efficiency of abrading action.

The clean abrasive is fed from the chamber 336 into chamber 306 through a duct 338 which extends below partition 304 and a slidable plate 339 controlled by a handle 340, extending to the outside of casing 2, regulates the flow of abrasive into chamber 306. From this chamber the buckets 310 elevate the clean abrasive spilling it on the far side of partition 316 onto an inclined plate 342 leading to a conveyor 340. Conveyor 340 feeds the abrasive to duct 242 from which it passes to the propelling mechanism 8. A by-pass valve 344 controlled by a linkage 346, see Figure 2, operatively connected to a lever 348, is arranged adjacent conveyor 340 so that a selected amount of the abrasive may be returned through a duct 350 to the storage chamber 336.

The by-pass valve 344 is provided so that the cleaned abrasive elevated from chamber 306 may be diverted thru the separator for further cleaning and then back into the storage chamber 336 during times when the wheel 234 is not running. If desired the duct 350 may lead directly to the storage chamber 336. Control over the amount of abrasive elevated by the buckets 310 and hence over the rate of discharge of abrasive from the propelling means 8 is obtained by means of the plate 339 which regulates the flow of cleaned abrasive from the storage chamber 336 to the compartment 306.

The movable elements of the abrasive handling and cleaning mechanism are all driven by the motor 270 by means of the sprocket 352, carried by the end of shaft 266, chain 354, and sprockets 356 and 358. An idler sprocket 360 directs the chain around the air cleaning apparatus. The upper sprocket 358 is urged upwardly by a tension mechanism 362, comprising rack 364, pinion 366 and guide roller 368. The pinion 366 is controlled by a weight and drum assembly or spring tension device, or other automatic torque producing means, tending to rotate it in a clockwise direction.

*Door and actuating mechanism*

Referring to Figure 8, door 7 comprises upper and lower sections 370—373, hinged together at 374. Adjustable stop screws 376—378 serve to limit pivotal movement of these sections in one direction so that a latching means 380, cooperating with lugs 382, will rigidly hold the lower edge 384, of section 372, firmly against an abutment member 386, carried by casing 2. The upper door section 370 is fixed to a shaft 388, journalled in bearings 390 bolted to the casing 2, see Figure 2. Associated with the left hand end of the shaft 388 is an operating lever 392.

Lever 392 is loosely mounted on shaft 388. A collar 389 carries a lug cooperating with a similar lug on hub 391 of lever 392 so that a lost motion connection is provided between lever 392 and shaft 388. These lugs are so arranged that shaft 388 may turn in door closing position without moving the lever while a downward pull on lever 392 causes rotation of shaft 388. With the parts in the position of Figure 2, door 7 is closed by pulling lever 392 downwardly as far as it will go. This swings door 7 down so that handles 406—406 may be grasped and closing of the door completed. On release of the lever 392 it returns to its original position as shown. On the other end of shaft 388 is a lever 394 and connected to this lever is a cable 396, trained over pulleys 398—400—402 and carrying a counterweight 404 at its end, see Figure 10.

Figure 10:
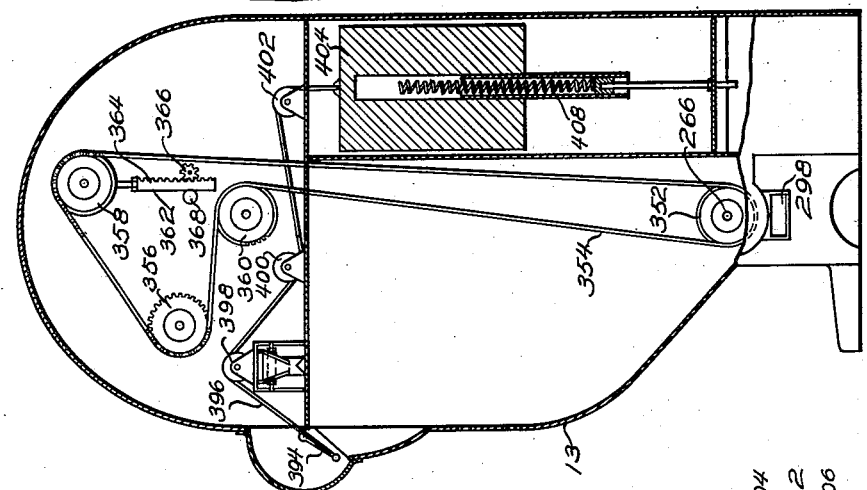

In Figure 10 the parts are shown as they would appear with the door closed and it will be observed that cable 396 is arranged just slightly beyond "dead center" with respect to lever 394. Thus weight 404 tends to hold the door closed. When it is desired to open the door, latch member 380 is rotated 180°, thus freeing it from the semi-circular recesses in the lugs 382, and the door is swung outwardly by means of handles 406. This causes lever 394 to turn clockwise, Figure 10, beyond "dead center," whereupon the door is swung upwardly by the action of weight 404. A spring 408 comes into action before the door reaches the open position shown in Figures 1 and 2, so as to partially offset the effect of the increased mechanical advantage of the lever and cable system as the parts approach "open" position. A downward pull on the lever 392 rotates the shaft 388 in a direction to close the door.

In the foregoing type of door construction the edges of the door abut against suitable surfaces provided on the casing and by carefully fitting and matching these surfaces a fairly effective seal will be provided. However, due to unavoidable inaccuracies in fabrication and the difficulty of matching these abutting surfaces, particularly where they are curved, this construction is not, in all cases, satisfactory. Therefore, I have devised a simple but very effective sealing means which may readily be applied to the door or closure described above and the edges of the opening in the casing which will now be described in detail.

Figure 28:
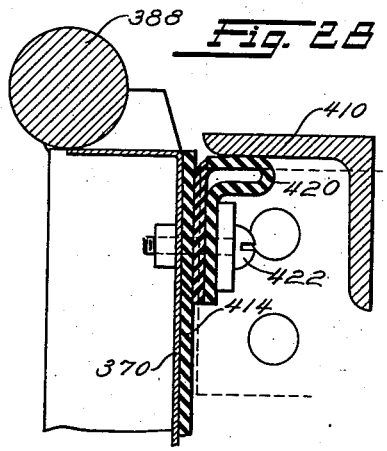
Figures 28, 29, 30, 31 and 32 are sectional views of portions of a modified door and sealing construction.
Figure 30:
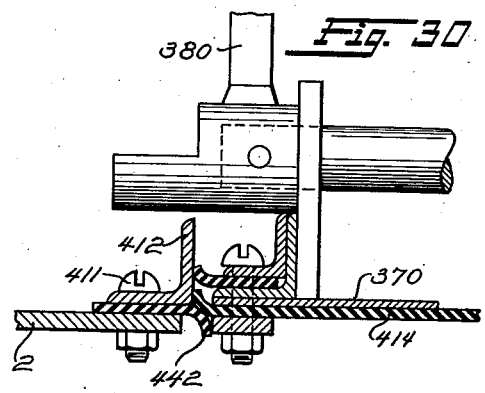
Figure 29:
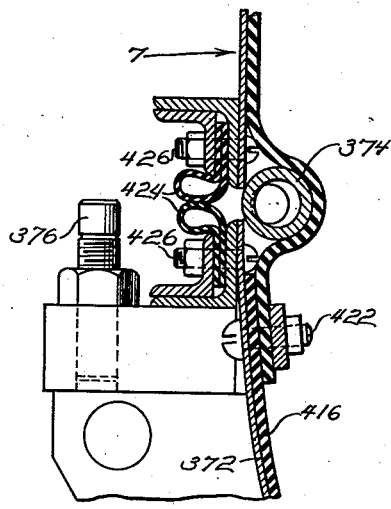
Figure 31:
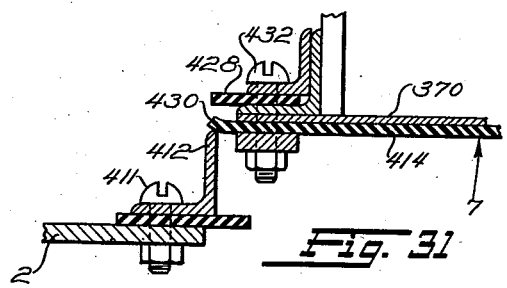
Figure 32:
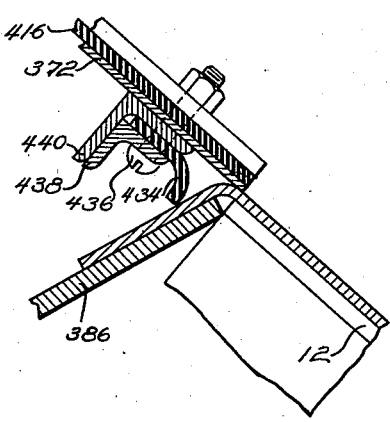

Referring now to Figures 28 to 32, which are sectional views taken through portions of the door and casing, Figures 28, 29 and 32 being sections transverse to the door adjacent to the upper hinge, middle hinge and lower edge of the door, respectively, while Figures 30 and 31 are sections transverse to the side edge of the door showing the same in fully and partially closed position, this improved sealing arrangement is shown in detail.

An angle iron 410 is secured adjacent the upper edge of opening 6 and angles 412 are secured to the side edges thereof in any suitable manner, as for example by bolts 411. A sheet of rubber, or other similar abrasion resisting material, 414 is held over the inside surface of the upper section 370 of the door by bolts 422 and overlies the hinge 374 in the manner shown in Figure 29, and a similar strip of rubber 416 is provided on the lower section 372.

Adjacent the upper hinge and angle 410 a folded rubber strip 420 is carried by the door and arranged to resiliently engage a flange of the angle 410 when the door is in closed position, as shown. Opposite to the middle hinge two similar folded rubber strips 424—424 are secured to the door sections by suitable angle irons and bolts 426—426 and are adapted to mutually engage in the manner illustrated in Figure 29.

The strip of rubber 414 is extended beyond the lateral edges of the door at 430 sufficiently to overlap the flange of angles 412 and a second rubber strip 428 is secured to the lateral edges of the door directly behind the ends 430 of strip 414 by means of bolts 432, see Figures 30 and 31. Also, a strip 434 is mounted on the lower edge of the door by bolts 436 and angles 438—440. A narrow piece of rubber 442 is secured around the side edges of opening 6 under the angles 412.

When the door is in closed position, as shown, these several rubber strips are brought into engagement with portions of the casing and strips 424—424 and 414—442 mutually abut, as is apparent from the drawings, and a very effective seal, entirely surrounding the door 7, is thus provided. Figure 31 illustrates the action of strip 428 and edge 430 of strip 414 during door closing action. As will be observed strips 434 and 442 provide a secondary or double seal about the side and bottom edges of the door. It is also pointed out that the several seals face into the tumbling chamber and thus prevent abrasive from building up between the door and casing and spilling out when the door is opened. Furthermore, due to the flexible character of the sealing strips, they need not be accurately fitted and the door elements need only be roughly fitted to the opening 6, thus a considerable saving of time and expense being effected. In addition, the entire inside surface of the door is completely covered with the resilient sealing material and thereby protected from abrasion.

In Figures 24–27 a modified type of tumbling apparatus embodying the principles of the present invention is disclosed. In this device an articulated work supporting structure can be caused to move along a curved path, as shown in Figure 25, either continuously in the same direction or alternately in opposite directions, and can also be selectively diverted from the path by suitable switch means, and caused to follow a longer path, thereby spreading the open ends thereof to provide loading and unloading positions, as shown in Figures 26 and 27.

The articulated work supporting structure, indicated generally at 500, comprises a series of similar plate elements 502 joined by suitable hinged connections, as at 504, represented by the small circles in Figures 25–27. One of these hinge connections 506 is open, i. e., arranged to readily separate for a reason later explained. Each of these plates carries a roller 508 on its opposite edges which cooperates with generally elliptical track means 510 which are of the same length as that of the articulated work supporting structure 500 and hence hold the openable hinge joint 506 in closed position. End plates 512, only one of which is seen in Figure 24, are operatively associated by the lugs 514 with the articulated work supporting structure so that by suitable rotational movement of the plates 512, the said structure is moved along the track 510, continuously in one direction or alternately in opposite directions, as desired.

The articulated work supporting structure 500, with heads or end plates 512, hence forms a trough-like tumbling chamber, the side-walls of which may be moved to cause a tumbling action. As the movement of the side-walls may be uni-directional or a reversing movement, it follows that objects placed within the chamber may be tumbled either always in the same direction through a stream of abrasive projected into the chamber from a propelling means 514a, or they may be tumbled through said stream alternately in opposite directions. It will also be obvious, that, by suitably regulating the speed and/or degree of rotation of the heads 512, the character of the tumbling action may be varied at will.

In order to cause the articulated work supporting structure 500 to assume the loading and unloading positions shown in Figures 26 and 27 respectively, a branch track means 516 and switch means 518 is provided. With the structure 500 traveling in a counter-clockwise direction, the switch 518 is thrown, just before the openable joint 506 passes, to engage the rollers 508. Thus the rollers 508, below the switch, will be directed into the branch track means. An automatic stop device is arranged to stop movement of the structure when it reaches the position shown in Figure 27. In this position objects contained in the tumbling chamber will be discharged therefrom by gravity, and a door may be provided of similar form to door 7, previously described.

After the unloading operation has been effected, the structure is driven in the opposite direction until the loading position shown in Figure 26 is reached, the chamber again loaded and movement of the structure continued to a point where it is entirely withdrawn from the branch track. At this time the switch 518 is returned to its normal position thereby closing off the branch track 516 from the main track 510, while simultaneously the automatic control means for the drive means is cut in so that the tumbling action progresses in either of the manners above described.

This device possesses the advantages present in the previously described tumbling mechanism and embodies the further feature of permitting a continuous tumbling action in one direction as well as allowing a reversing tumbling action of widely varying extents of movement in either direction.

As will be readily understood suitable abrasive handling, cleaning and storing apparatus is also provided in this modified device and the same will preferably take the form of that described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a tumbling mechanism, a frame structure and a housing; a tumbling mechanism supported on said frame and within said housing; said housing having an opening therein adjacent to said tumbling mechanism and providing access thereto; a closure for said opening; said tumbling mechanism comprising a flexible work supporting structure guided for movement along a curved path and having free ends; means for moving said structure along said path alternately in opposite directions, to tumble the work; said means also being operable to selectively position one of said free ends of said structure at predetermined lower points along said path to bring said tumbling mechanism into loading and unloading positions adjacent to said opening.

2. In a tumbling mechanism, a housing; a tumbling mechanism supported in said housing; said housing having an opening therein adjacent said tumbling mechanism and providing access thereto; a removable closure for said opening; said tumbling mechanism comprising a flexible work supporting structure having free ends and guided for movement along a looped path to form the side walls of a trough-like tumbling chamber; means for moving said structure along said path to impart a tumbling action to objects contained in said chamber; said means being also operable to selectively position one of said free ends of said structure at predetermined points along said path, one of said points being located so that a low side is provided on said tumbling chamber adjacent to said opening for loading purposes, the other point being so located as to bring said end of said structure to the bottom of said loop, whereby objects contained within said chamber will fall therefrom through said opening.

3. A tumbling device comprising a flexible work supporting structure; means mounting said supporting structure for movement along a path including a loop to form the bottom and side walls of an upwardly opening trough-shaped tumbling chamber having an elongated upwardly facing opening; means for reciprocating said supporting structure along said path to give a reversing movement to said wall of said trough-shaped chamber, whereby objects placed in said chamber will be alternately tumbled in opposite directions, said flexible work supporting structure being greater in length than the portion thereof forming the bottom of the chamber whereby objects in said chamber will be turned completely over during each reciprocation, and means for projecting a stream of abrasive downwardly through said opening for blast cleaning said objects as they are tumbled in said tumbling chamber.

4. In a tumbling device a flexible supporting structure having two free ends; means for guiding said structure in a path including a downwardly extending loop; means for reciprocating said structure along said path to cause portions of said structure traversing said loop to form a generally trough-like tumbling chamber; means normally limiting said reciprocation of said structure so that the ends thereof do not enter said loop; and control means for rendering said limiting means ineffective, said control means being also operable to position one end of said structure in a dumping position adjacent the bottom of said loop.

5. In a tumbling device a flexible supporting structure having two free ends; means for guiding said structure in a path including a downwardly extending loop; means for reciprocating said structure along said path to cause portions of said structure traversing said loop to form a generally trough-like tumbling chamber; means normally limiting said reciprocation of said structure so that the ends thereof enter said loop but come to rest well above the bottom thereof; and control means for rendering said limiting means ineffective, said control means being also operable to position one end of said structure in a dumping position adjacent the bottom of said loop.

6. In a tumbling device, a flexible supporting structure having two free ends; means for guiding said structure in a curved path including a downwardly extending loop; drive means for moving said structure along said curved path thereby causing portions thereof successively traversing said loop to form the wall of a trough-like tumbling chamber; control means for normally reversing movement of said structure before the trailing end of the same enters said loop, whereby said trough-like chamber is maintained and a reciprocating movement is given said wall thereof; said control means being also operable to selectively position one end of said structure at the bottom of said loop for dumping or adjacent one end of said loop for loading.

7. In a tumbling mechanism, a pair of spaced head members rotatably mounted in a housing, an arcuate plate extending between and secured to said head members, a series of articulated elements pivotally secured to each of the opposite edges of said plate and adapted to partially surround said head members, arcuate track means associated with said head members, roller elements carried by said articulated elements and engaging said track means to hold said elements in surrounding relation to said heads, branch track means cooperating with said arcuate track means at their ends, switch means normally connecting said branch track means and the ends of said arcuate track means to form a continuous track, the combined length of said plate and said series of articulated elements being greater than the length of said arcuate track means, so that when said head members are rotated to position said plate vertically below the centers of said arcuate track means, a plurality of the articulated elements of each series extend into each of said branch track means; said plate member, said head members and the portions of said series of articulated elements engaging said arcuate track means providing the walls of an upwardly facing trough-like tumbling chamber, means for oscillating said heads to alternately project and withdraw each series of articulated elements into and from its cooperating branch track means, said oscillation being such that the ends of said series of articulated elements do not pass below the centers of rotation of said heads, whereby a reciprocating movement is imparted to the wall of said chamber formed by said plate and articulated elements while the trough-like character thereof is maintained.

8. The tumbling mechanism set forth in claim 7, wherein means are provided for rotating said heads in one direction beyond the point of normal reversal of said oscillation to selectively position one end of said series of articulated elements directly below the centers of said head members thereby opening one side of said trough-like chamber for dumping articles therefrom, said switch means being operable to cause said other series of articulated elements to be withdrawn from its respective branch track means and folded back upon said plate member on the upper edges of said plate members.

9. In a tumbling device, a flexible support including spaced head members rotatably mounted about coincident axes, a plate member extending between and fixed at its ends to said head members for effecting synchronous rocking movement of the latter, a series of articulated elements pivotally secured to each of the opposite edges of said plate member, said series being unconnected to each other, and guide means for causing said plate member and said articulated elements to cooperate with said head members during rocking movement of the head members to form a trough-like tumbling chamber having an upwardly-facing, elongated opening.

10. In a tumbling device, a flexible support including spaced head members rotatably mounted about coincident axes, a plate member extending between and fixed at its ends to said head members to cause synchronous rocking movements of the latter, a series of articulated elements pivotally secured to each of the opposite edges of said plate member, said series being unconnected to each other, each of said series comprising interconnected rod members having plate members secured thereto, said last-named plate members overlapping at adjacent edges, means for holding said adjacent edges in assembled relation, and guide means for causing said plate member and said articulated elements to cooperate with said head members during rocking movement of the head members to form a trough-like tumbling chamber having an upwardly-facing, elongated opening.

11. The tumbling device set forth in claim 10, wherein said last named means is operable to yield and permit a limited separation of said adjacent edges of said plates.

12. In a tumbling device, the combination set forth in claim 10 wherein said articulated elements are interconnected by means of releasably hinged joints.

13. In a tumbling machine a housing enclosing a tumbling device and having a vertically extending opening providing access to said mechanism, a closure structure for said opening comprising upper and lower sections connected together for relative pivotal movement, adjustable stop means carried by said sections adjacent their hinge for limiting relative pivotal movement thereof in one direction, and for causing said sections to accurately conform to the shape of said housing when said sections are in closed position and said stop means are in abutting relation to each other, means for hinging said upper section to said housing adjacent to said opening, latch means mounted on one of said sections adjacent said adjustable stop means, and latch receiving means carried by said housing, said latch means being engageable with said receiving means for holding said closure in closing position over said opening with said stop means in abutting relation, said latch means also being operable for releasing said closure to permit said closure to be swung away from said opening on said hinging means.

14. In a tumbling machine a housing enclosing a tumbling device and having an opening therein, a closure for said opening comprising hinged sections, laterally projecting abutment surfaces on said housing adjacent the edges of said opening, a resilient element overlying the inside surfaces of said closure sections and having extending portions beyond the lateral edges thereof, a resilient strip on said closure spaced from said extending portions, a resilient strip mounted on said housing adjacent to said abutment surfaces, said last-named strip engaging said extending portions and said first-named strip engaging said laterally projecting abutment surfaces when said closure is in closed position.

15. In a tumbling mechanism, the combination set forth in claim 14, wherein the bottom edge of said closure is also provided with a resilient strip engaging an abutment surface on said housing adjacent the lower edge of said opening.

16. In a tumbling device, a flexible support including rotatably mounted spaced head members, a plate member extending between and fixed at its ends to said head members, a series of articulated elements pivotally secured to opposite edges of said plate member, each of said series comprising a plurality of plate members having transverse rod members secured thereto, links for interconnecting said rod members, said links being pivotally interconnected and carrying bearing elements, bearing surfaces on said transverse rod members for engaging said bearing elements, said bearing surfaces and said bearing elements being shaped to prevent axial movement of said rod members during operation of the device.

17. An abrading machine comprising a housing member; a tumbling mechanism in said housing comprising a flexible work supporting structure having two free ends, means for guiding the work supporting structure through a path forming an upwardly opening loop; means to reciprocate said work supporting structure in said path whereby objects within said tumbling mechanism will be alternately tumbled, first in one direction and then the other, across the bottom of said loop; an abrasive propelling device mounted on said housing above said loop and operable to project a stream of abrasive towards the bottom of said loop, whereby said objects are passed and repassed through said stream alternately in opposite directions.

18. In a tumbling device, a housing assembly having spaced side walls, circular head members rotatably mounted adjacent said side walls, a generally circular track member of greater diameter than said head members mounted on each of said walls concentric to said head members, branch track members associated with said side walls and connecting with said circular track members at points above the axis of said heads, an arcuate element extending between said heads and rigidly connected thereto, a series of articulated sections pivotally mounted on opposite edges of said arcuate element and supported for movement along said track members, said articulated sections extending partially into said branch track members when said head members are rotated to bring said arcuate element vertically below the axis of said heads, means to oscillate said heads and thereby reciprocate said arcuate element and said articulated sections along said track members, means controlling the oscillation of said heads so that said articulated sections are alternately withdrawn from and projected into said branch track members.

19. In a tumbling device, the combination set forth in claim 18, wherein said controlling means is also operable to selectively position the end of one of said articulated sections adjacent the lowermost points of said circular track members for unloading purposes, or in a position adjacent to a horizontal plane passing through the axis of said heads for loading purposes.

20. In a tumbling mechanism spaced rotatable heads, an arcuate element joined to and extending between said heads, a series of articulated elements hinged to one of the edges of said arcuate element, circular track means arranged concentrically around each of said heads, track engaging means on said articulated elements, branch track means connected to said circular track means and extending away therefrom, switches arranged adjacent to the point of connection of said branch track means with said circular track means, means for oscillating said head members and thereby reciprocate said articulated elements along said track members, said switches being normally positioned so as to direct said track engaging means into and out of said branch track means when the latter is traveling in a given direction, and control means associated with said oscillating means operable to position said switches so that said track engaging means are directed out of said branch track means in the opposite direction.

21. In a tumbling machine, a housing enclosing a tumbling device, an opening in said housing providing access to said device, a closure for said opening, a rod fixed to said closure and journaled on said housing, a lever fixed to said rod, force exerting means associated with said lever, said force exerting means being arranged so as to have a variable turning effect on said rod as said closure is opened and closed and also to bring said lever into substantially parallelism with the direction of action of said force exerting means when said closure is closed.

22. In an abrading apparatus, a barrel head assembly comprising a pair of disc-like members mounted for rocking movement about a common axis, a curved member interconnecting said members for synchronous rocking movement and also forming a wall of the tumbling barrel, means for rockably supporting one of said disc-like members, comprising a shaft mounted in bearings adjacent the latter disc-like member, a disc rigidly mounted on said shaft, and a plurality of circumferentially spaced axially directed pins interconnecting said disc and the disc-like member which is associated with said shaft, each of said pins having a resiliently yieldable sleeve constituting the driving connection between said disc and the disc-like member which is associated with said shaft for absorbing shocks imparted to said member by work tumbling in said barrel.

ERIC O. HAMREN.